US012597991B2

(12) United States Patent
Itokawa et al.

(10) Patent No.: US 12,597,991 B2
(45) Date of Patent: Apr. 7, 2026

(54) WIRELESS COMMUNICATION SYSTEM, WIRELESS COMMUNICATION APPARATUS, WIRELESS COMMUNICATION METHOD AND PROGRAM

(71) Applicant: NTT, Inc., Tokyo (JP)

(72) Inventors: Kiyohiko Itokawa, Musashino (JP); Yasuyoshi Kojima, Musashino (JP); Daisuke Goto, Musashino (JP); Kazumitsu Sakamoto, Musashino (JP)

(73) Assignee: NTT, Inc., Tokyo (JP)

( * ) Notice: Subject to any disclaimer, the term of this patent is extended or adjusted under 35 U.S.C. 154(b) by 317 days.

(21) Appl. No.: 18/268,021

(22) PCT Filed: Dec. 25, 2020

(86) PCT No.: PCT/JP2020/048812
§ 371 (c)(1),
(2) Date: Jun. 16, 2023

(87) PCT Pub. No.: WO2022/137528
PCT Pub. Date: Jun. 30, 2022

(65) Prior Publication Data
US 2024/0056169 A1     Feb. 15, 2024

(51) Int. Cl.
*H04B 7/185*          (2006.01)
*H04B 7/155*          (2006.01)
(52) U.S. Cl.
CPC ................................... *H04B 7/185* (2013.01)

(58) Field of Classification Search
None
See application file for complete search history.

(56) References Cited

U.S. PATENT DOCUMENTS 6,724,761 B1 *  4/2004  Moy-Yee ........... H04B 7/18586
                                                   370/390
6,804,492 B2 *  10/2004  Kay ........................ H04W 8/04
                                                   455/12.1
(Continued)

FOREIGN PATENT DOCUMENTS

EP          2566068 A1      3/2013
JP        2019012902 A      1/2019
WO      WO-2011/135615 A1   11/2011

*Primary Examiner* — Tuan A Tran

(57)          ABSTRACT

Provided is a wireless communication system including a plurality of terminal devices, a relay device mounted on a mobile object, and at least one base station device, in which the terminal device includes a terminal device transmission unit that transmits a signal including transmission data to the relay device, and the relay device includes: a relay device reception unit that receives the signal transmitted from the terminal device; a plurality of queues that stores the transmission data included in the signal; a sorting unit that sorts and records the transmission data included in the signal into any one of the plurality of queues on the basis of a preamble pattern included in the signal or a reception timing of the signal; and a relay device transmission unit that transmits signals indicating the transmission data recorded in the plurality of queues to the base station device at a timing at which communication with the base station device is possible, while prioritizing transmission data recorded in a predetermined queue among the plurality of queues.

21 Claims, 12 Drawing Sheets

(56)                    References Cited

U.S. PATENT DOCUMENTS

| | | | | |
|---|---|---|---|---|
| 7,974,227 | B1 * | 7/2011 | Seay | H04B 7/155 |
| | | | | 455/430 |
| 8,774,732 | B2 * | 7/2014 | Kobayakawa | H04B 7/155 |
| | | | | 370/335 |
| 9,763,167 | B2 * | 9/2017 | Gopal | H04W 40/02 |
| 9,787,392 | B2 * | 10/2017 | Baudoin | H04W 40/14 |
| 10,361,774 | B2 * | 7/2019 | Baudoin | H04B 7/18521 |
| 10,560,181 | B2 * | 2/2020 | Russell | H04W 4/46 |
| 10,848,235 | B2 * | 11/2020 | Choquette | H04L 1/0003 |
| 10,903,899 | B2 * | 1/2021 | Baudoin | H04B 7/18519 |
| 11,153,786 | B2 * | 10/2021 | Torres | H04W 28/24 |
| 11,405,887 | B2 * | 8/2022 | Fong | H04W 52/0235 |
| 2003/0202533 | A1 * | 10/2003 | Taylor | H04B 7/18519 |
| | | | | 370/468 |
| 2009/0213000 | A1 * | 8/2009 | Gross | G01S 5/10 |
| | | | | 342/357.395 |

* cited by examiner 4-2

4-1

4-1

4-1

4-1

L

| PREAMBLE PATTERN A |
|---|
| PREAMBLE PATTERN C |
| PREAMBLE PATTERN F |

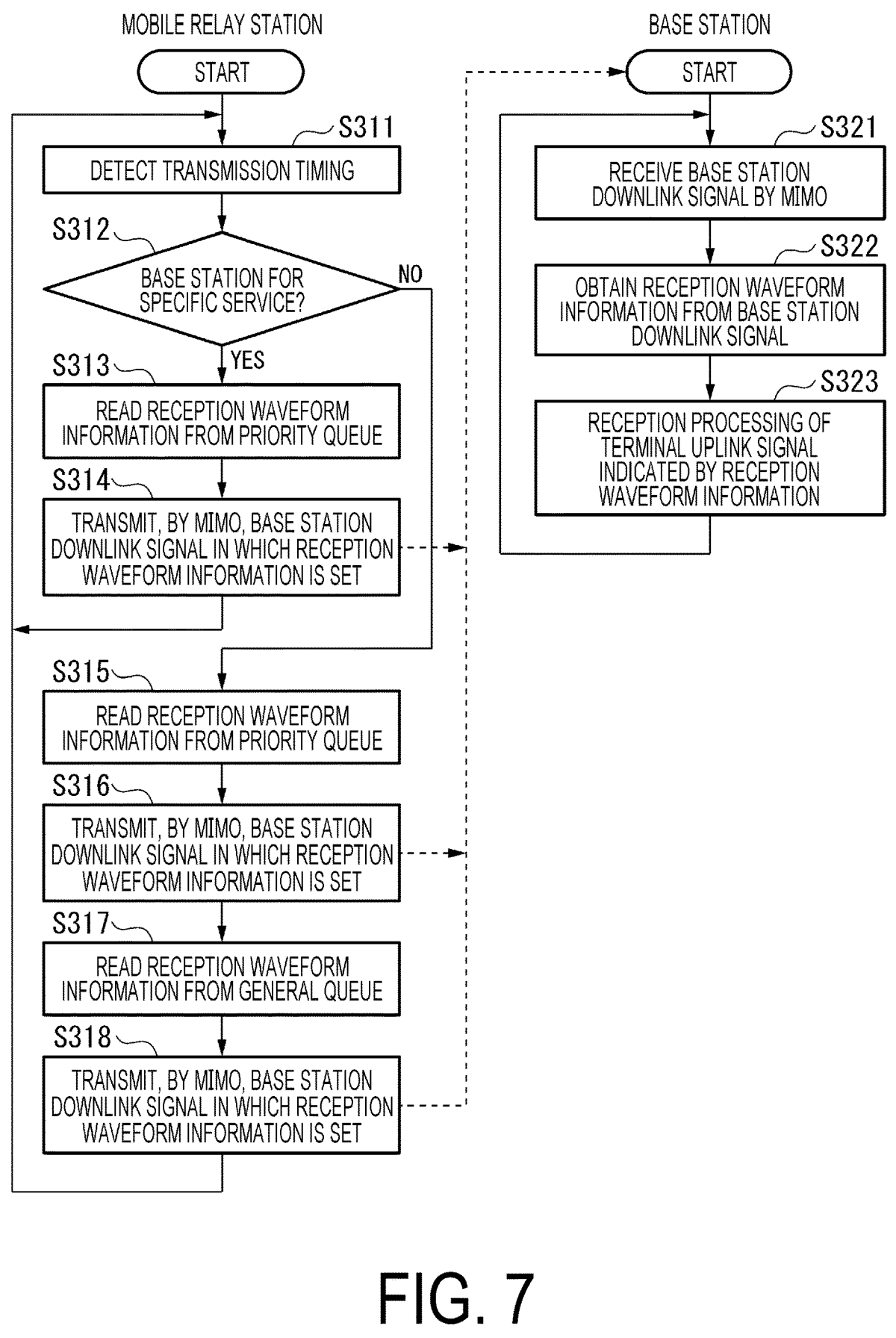

MOBILE RELAY STATION

BASE STATION

START

START

S311

DETECT TRANSMISSION TIMING

S312

BASE STATION FOR SPECIFIC SERVICE?

NO

YES

S313

READ RECEPTION WAVEFORM INFORMATION FROM PRIORITY QUEUE

S314

TRANSMIT, BY MIMO, BASE STATION DOWNLINK SIGNAL IN WHICH RECEPTION WAVEFORM INFORMATION IS SET

S315

READ RECEPTION WAVEFORM INFORMATION FROM PRIORITY QUEUE

S316

TRANSMIT, BY MIMO, BASE STATION DOWNLINK SIGNAL IN WHICH RECEPTION WAVEFORM INFORMATION IS SET

S317

READ RECEPTION WAVEFORM INFORMATION FROM GENERAL QUEUE

S318

TRANSMIT, BY MIMO, BASE STATION DOWNLINK SIGNAL IN WHICH RECEPTION WAVEFORM INFORMATION IS SET

S321

RECEIVE BASE STATION DOWNLINK SIGNAL BY MIMO

S322

OBTAIN RECEPTION WAVEFORM INFORMATION FROM BASE STATION DOWNLINK SIGNAL

S323

RECEPTION PROCESSING OF TERMINAL UPLINK SIGNAL INDICATED BY RECEPTION WAVEFORM INFORMATION

FIG. 7

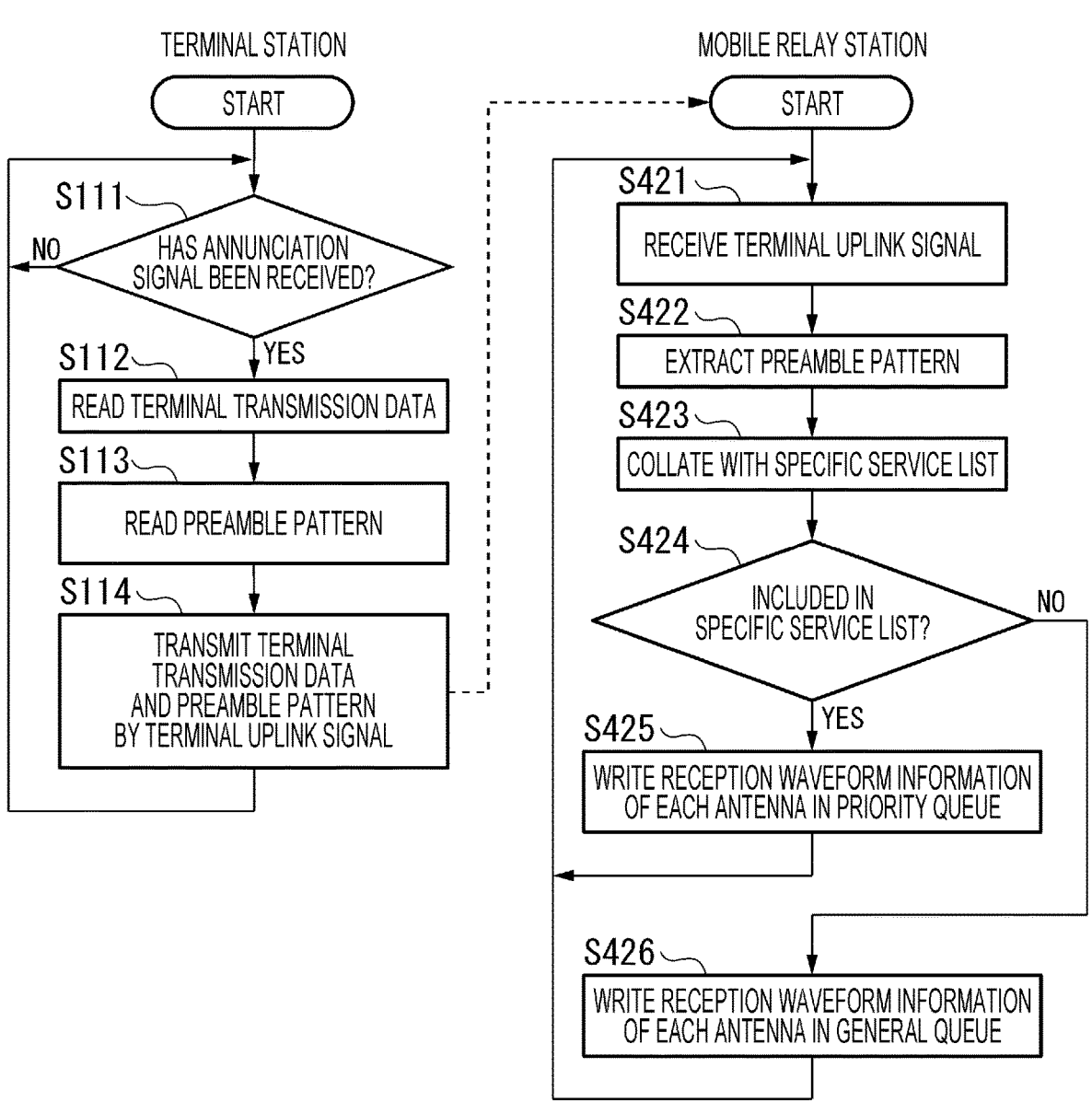

TERMINAL STATION

START

S111 — HAS ANNUNCIATION SIGNAL BEEN RECEIVED?

NO

YES

S112 — READ TERMINAL TRANSMISSION DATA

S113 — READ PREAMBLE PATTERN

S114 — TRANSMIT TERMINAL TRANSMISSION DATA AND PREAMBLE PATTERN BY TERMINAL UPLINK SIGNAL

MOBILE RELAY STATION

START

S421 — RECEIVE TERMINAL UPLINK SIGNAL

S422 — EXTRACT PREAMBLE PATTERN

S423 — COLLATE WITH SPECIFIC SERVICE LIST

S424 — INCLUDED IN SPECIFIC SERVICE LIST?

NO

YES

S425 — WRITE RECEPTION WAVEFORM INFORMATION OF EACH ANTENNA IN PRIORITY QUEUE

S426 — WRITE RECEPTION WAVEFORM INFORMATION OF EACH ANTENNA IN GENERAL QUEUE

FIG. 9

WIRELESS COMMUNICATION SYSTEM, WIRELESS COMMUNICATION APPARATUS, WIRELESS COMMUNICATION METHOD AND PROGRAM

CROSS-REFERENCE TO RELATED APPLICATIONS

This application is a 371 National Stage of International Application No. PCT/JP2020/048812, filed on Dec. 25, 2020. The entire disclosure of the above application is incorporated herein by reference.

TECHNICAL FIELD

The present invention relates to a wireless communication system, a wireless communication apparatus, a wireless communication method and a program.

BACKGROUND ART

Internet of Things (IoT) systems that implement various applications by connecting small terminal devices to the Internet have become widespread. As an application example of such an IoT system, a system is known in which a plurality of IoT terminals senses environmental information such as temperature, room temperature, acceleration, and luminous intensity and transmits the environmental information by radio signals, and the environmental information is collected by the cloud. IoT terminals provided with various sensors are installed in various places. For example, it is also assumed that IoT is used to collect data of places where it is difficult to install base stations, such as buoys and ships on the ocean and mountainous areas.

On the other hand, there is a wireless system that uses a communication satellite, an unmanned aerial vehicle (UAV), or the like as a relay station to perform wireless communication between a plurality of communication devices on the ground. A wireless system including a communication satellite as a relay station uses a low earth orbit (LEO) satellite that orbits at a low altitude of approximately 1,000 [km] in some cases, and uses a geostationary orbit (GEO) satellite that orbits at an altitude of 36,000 [km] in other cases. A low earth orbit satellite has a shorter propagation distance than a geostationary orbit satellite. Thus, in a case where a low earth orbit satellite is used as a relay station, it is possible to achieve communication with low delay and low propagation loss. In this case, it becomes easy to configure a high-frequency circuit included in the low earth orbit satellite or the communication device on the ground. However, unlike the geostationary orbit satellite, the low earth orbit satellite orbits in the sky above the Earth, and thus, the direction of the satellite viewed from the communication device on the ground constantly changes. From each communication device on the ground, the low earth orbit satellite is visible for about 10 minutes or less during one orbit. Thus, a time period during which the low earth orbit satellite and each communication device on the ground can communicate with each other is limited.

On the other hand, Low Power Wide Area (LPWA) is known as a wireless system capable of wide-area communication with low power and a low transmission rate suitable for communication of IoT terminals. In recent years, a satellite IoT system in which a communication satellite uses LPWA to collect data from an IoT terminal has been studied. In general, wireless communication between a communication satellite and a communication device on the ground has a longer propagation distance than wireless communication in which direct communication is performed between a plurality of communication devices on the ground. However, LPWA can be applied when a low earth orbit satellite is used. In a case of such a satellite IoT system, it is possible to contain IoT terminals in the aeronautical field, the ship field, and rural areas, which has been difficult only with normal LPWA. In this case, a hub station is not required, and this facilitates service deployment.

Meanwhile, in a wireless system using a low earth orbit satellite, as described above, the time period during which the low earth orbit satellite and each communication device on the ground can communicate with each other is limited. Thus, in a case where data transfer has not been completed during the communication available time period, the data transfer is suspended until the next communication available time period starts. Thus, for example, in a satellite IoT system using a low earth orbit satellite, a long delay time may occur from when an IoT terminal transmits data to the low earth orbit satellite until the low earth orbit satellite transfers the data to a communication device on the ground. To address such a problem, for example, a satellite communication system described in Patent Literature 1 is aimed at achieving highly efficient transmission by allocating a plurality of satellite channels to the same transmission/reception station and transmitting data.

CITATION LIST

Patent Literature

Patent Literature 1: JP 2019-12902 A

SUMMARY OF INVENTION

Technical Problem

Since the satellite communication system described in Patent Literature 1 uses a plurality of satellite channels, a mechanism capable of simultaneously transmitting and receiving a plurality of carriers (carrier waves) is required in communication devices on both the transmission side and the reception side. However, in satellite IoT systems, IoT terminals need to be driven for a long time in remote areas such as on the ocean and mountainous areas in some cases. Thus, as the IoT terminals, the devices are required to be simpler, smaller, lighter, and less power consuming in some cases. For these reasons, satellite IoT systems have a problem in that it is difficult to make the devices more complicated for the purpose of reducing delays in data transfer.

In view of the above circumstances, it is an object of the present invention to provide a wireless communication system, a wireless communication apparatus, a wireless communication method and a program capable of reducing delays in data transfer while preventing complication of a device.

Solution to Problem

One aspect of the present invention provides a wireless communication system including a plurality of terminal devices, a relay device mounted on a mobile object, and at least one base station device, in which the terminal device includes a terminal device transmission unit that transmits a signal including transmission data to the relay device, and the relay device includes: a relay device reception unit that receives the signal transmitted from the terminal device; a plurality of queues that stores the transmission data included in the signal; a sorting unit that sorts and records the transmission data included in the signal into any one of the plurality of queues on the basis of a preamble pattern included in the signal or a reception timing of the signal; and a relay device transmission unit that transmits signals indicating the transmission data recorded in the plurality of queues to the base station device at a timing at which communication with the base station device is possible, while prioritizing transmission data recorded in a predetermined queue among the plurality of queues.

One aspect of the present invention provides a wireless communication device mounted on a mobile object, the wireless communication device including: a reception unit that receives a signal including transmission data transmitted from a terminal device; a plurality of queues that stores the transmission data included in the signal; a sorting unit that sorts and records the transmission data included in the signal into any one of the plurality of queues on the basis of a preamble pattern included in the signal or a reception timing of the signal; and a transmission unit that transmits signals indicating the transmission data recorded in the plurality of queues to a base station device at a timing at which communication with the base station device is possible, while prioritizing transmission data recorded in a predetermined queue among the plurality of queues.

One aspect of the present invention provides a wireless communication method to be executed by a wireless communication system including a plurality of terminal devices, a relay device mounted on a mobile object, and at least one base station device, the wireless communication method including: a terminal device transmission step of transmitting, by the terminal device, a signal including transmission data to the relay device; a relay device reception step of receiving, by the relay device, the signal transmitted from the terminal device; a sorting step of sorting and recording, by the relay device, the transmission data included in the signal into any one of a plurality of queues on the basis of a preamble pattern included in the signal or a reception timing of the signal; and a relay device transmission step of transmitting, by the relay device, signals indicating the transmission data recorded in the plurality of queues to the base station device at a timing at which communication with the base station device is possible, while prioritizing transmission data recorded in a predetermined queue among the plurality of queues.

One aspect of the present invention provides a wireless communication method to be executed by a wireless communication device mounted on a mobile object, the wireless communication method including: a receiving step of receiving a signal including transmission data transmitted from a terminal device; a sorting step of sorting and recording the transmission data included in the signal into any one of a plurality of queues on the basis of a preamble pattern included in the signal or a reception timing of the signal; and a transmission step of transmitting signals indicating the transmission data recorded in the plurality of queues to a base station device at a timing at which communication with the base station device is possible, while prioritizing transmission data recorded in a predetermined queue among the plurality of queues.

One aspect of the present invention provides a program for causing a computer to function as the wireless communication device.

Advantageous Effects of Invention

According to the present invention, it is possible to reduce delays in data transfer while preventing complication of a device.

BRIEF DESCRIPTION OF DRAWINGS

FIG. 7 is a flowchart illustrating processing of the wireless communication system according to the embodiment.

FIG. 9 is a flowchart illustrating processing of the wireless communication system according to the embodiment.

DESCRIPTION OF EMBODIMENTS

Embodiments of the present invention will be described in detail below with reference to the drawings.

First Embodiment

Figure 1:
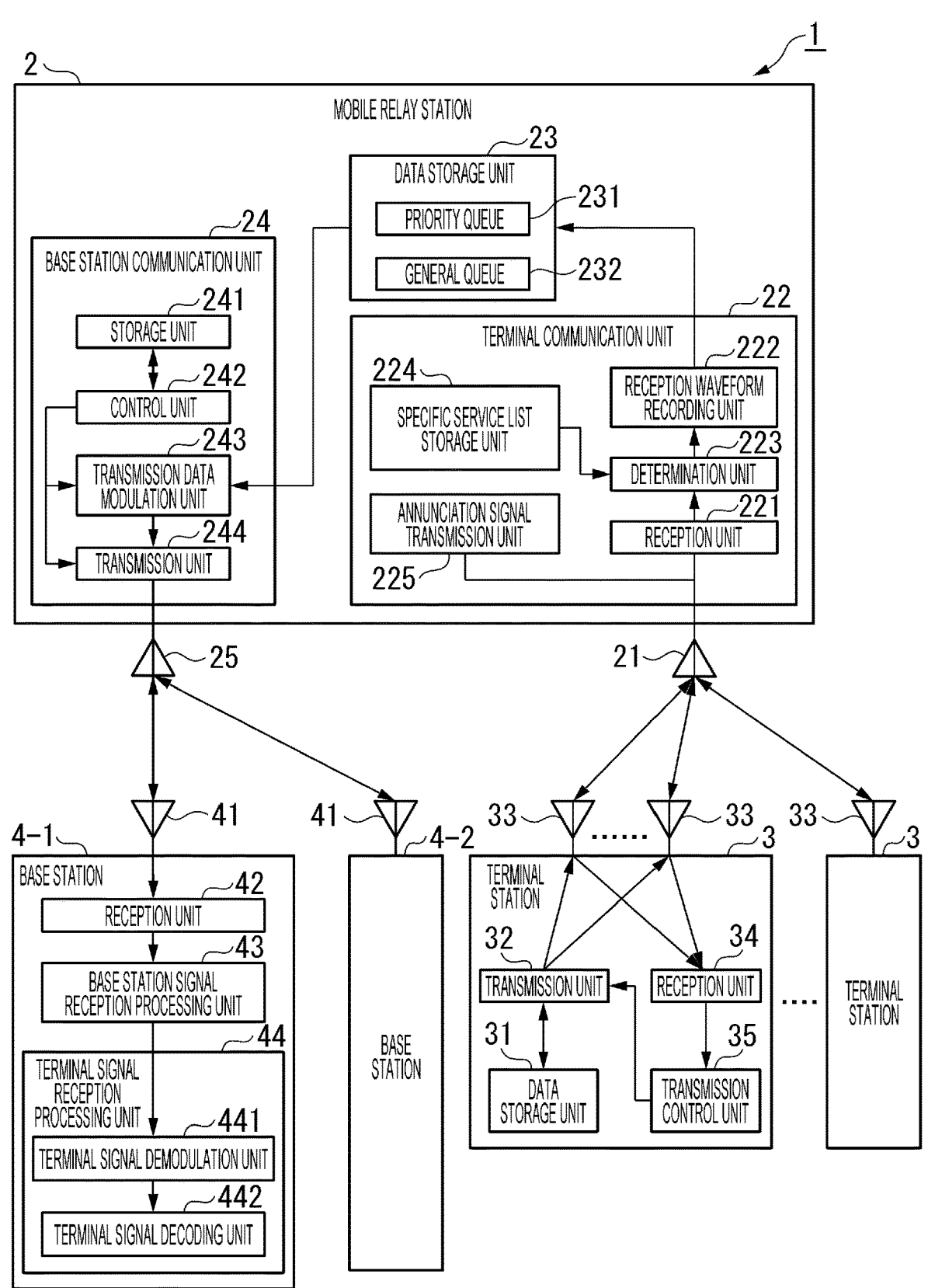
FIG. 1 is a configuration diagram of a wireless communication system according to a first embodiment of the present invention.

FIG. 1 is a configuration diagram of a wireless communication system 1 according to a first embodiment. The wireless communication system 1 includes a mobile relay station 2, a terminal station 3, a base station 4-1, and a base station 4-2. Information transmitted from each one of a plurality of the terminal stations 3 is transmitted via the mobile relay station 2 and collected by the base station 4-1 or the base station 4-2. The wireless communication system 1 is a communication system that transmits information for which immediacy is not required.

The numbers of the mobile relay stations 2, the terminal stations 3, the base stations 4-1, and the base stations 4-2 included in the wireless communication system 1 are optional, in which the number of the terminal stations 3 is assumed to be large, and the number of the base stations 4-1 is assumed to be two or more. A difference between the base station 4-1 and the base station 4-2 will be described later.

The mobile relay station 2 is an example of a relay device that is mounted on a mobile object, with a communication available area moving as time proceeds. The mobile relay station 2 is included in, for example, a low earth orbit (LEO) satellite. The altitude of the LEO satellite is approximately 2000 [km] or less, and the LEO satellite orbits in the sky above the Earth in about 1.5 hours per orbit.

While moving in the sky above the Earth, the mobile relay station 2 receives data by a radio signal transmitted from each one of the plurality of terminal stations 3. The mobile relay station 2 accumulates these pieces of received data, and collectively transmits, in a wireless manner, the accumulated data to the base station 4-1 at a timing at which communication with the base station 4-1 is possible. Alternatively, the mobile relay station 2 collectively transmits, in a wireless manner, the accumulated data to the base station 4-2 at a timing at which communication with the base station 4-2 is possible. The base station 4-1 and the base station 4-2 receive, from the mobile relay station 2, data collected by the terminal stations 3.

It is conceivable to use, as the mobile relay station 2, a relay station mounted on an unmanned aerial vehicle such as a geostationary orbit satellite, a drone, or a high altitude platform station (HAPS). However, in a case of a relay station mounted on a geostationary orbit satellite, a coverage area (footprint) on the ground is large, but link budget for an IoT terminal installed on the ground is extremely small due to the high altitude. On the other hand, in a case of a relay station mounted on a drone or a HAPS, the link budget is high, but the coverage area is small. Furthermore, the drone requires a battery, and the HAPS requires a battery and a solar panel for charging the battery.

In the present embodiment, the mobile relay station 2 is mounted on an LEO satellite. Thus, in addition to the link budget remaining within limits, the LEO satellite, which orbits above the atmosphere, is free of air resistance and consumes less fuel. In addition, the footprint is larger than that in the case of the relay station mounted on the drone or the HAPS.

Since the mobile relay station 2 mounted on the LEO satellite performs communication while moving at a high speed, the time during which each of the terminal stations 3, the base station 4-1, and the base station 4-2 can communicate with the mobile relay station 2 is limited. Specifically, when viewed from a terminal station on the ground, the mobile relay station 2 passes overhead in approximately 10 minutes or less. In addition, wireless communication schemes of various specifications are used for the terminal stations 3.

Thus, the mobile relay station 2 receives a terminal uplink signal from the terminal station 3 inside the coverage at the current position of the moving mobile relay station 2, and stores waveform data of the received terminal uplink signal. The mobile relay station 2 transmits, in a wireless manner, a base station downlink signal in which the waveform data of the terminal uplink signal is set, to the base station 4-1 at a timing at which the base station 4-1 is in the coverage. Alternatively, the mobile relay station 2 transmits, in a wireless manner, the base station downlink signal in which the waveform data of the terminal uplink signal is set, to the base station 4-2 at a timing at which the base station 4-2 is in the coverage. The base station 4-1 and the base station 4-2 demodulate the base station downlink signal received from the mobile relay station 2 to obtain the waveform data of the terminal uplink signal. The base station 4-1 and the base station 4-2 demodulate and decode the terminal uplink signal indicated by the waveform data to obtain terminal transmission data, which is data transmitted by the terminal station 3.

The terminal stations 3 are installed on the Earth, such as on the ground or on the ocean. The plurality of terminal stations 3 are located at different places. The terminal stations 3 are, for example, IoT terminals. The terminal stations 3 collect data such as environmental data detected by sensors, and wirelessly transmit the collected data to the mobile relay station 2. In the drawing, only two terminal stations 3 are illustrated.

The base station 4-1 and the base station 4-2 are installed on the Earth, such as on the ground or on the ocean. A plurality of the base stations 4-1 and the base station 4-2 are located at different places.

Figure 2:
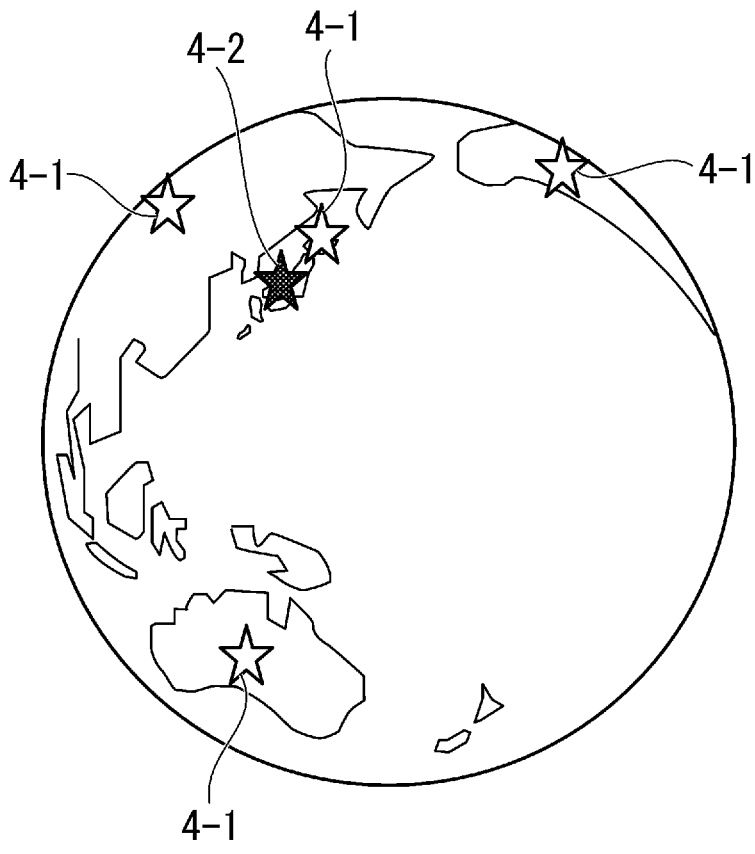
FIG. 2 is a schematic diagram illustrating an installation position of a base station according to the embodiment.

FIG. 2 is a schematic diagram illustrating the installation positions of the base stations 4-1 and the base station 4-2 according to the first embodiment. In FIG. 2, a black star indicates the installation position of the base station 4-1, and a white star indicates the installation position of the base station 4-2. As illustrated in FIG. 2, for example, the base stations 4-1 are installed at a plurality of different locations on the Earth. For example, the base station 4-2 is installed at one location on the Earth.

In the present embodiment, the base stations 4-1 are base station devices for a specific service, and the base station 4-2 is a base station device for general services. The base station devices for a specific service are base station devices that receive data of the specific service from the mobile relay station 2. On the other hand, the base station device for general services is a base station device that receives data of the specific service and data of the general services from the mobile relay station 2. Note that the base station device for general services may be a base station device that receives only data of general services from the mobile relay station 2.

The specific service is a service in which terminal transmission data transmitted from the terminal stations 3 is transferred, preferentially over general services, to a base station device on the ground (base station 4-1 or base station 4-2). For example, the specific service is a service in which terminal transmission data is desired to be transferred to a base station device more quickly (with less transfer delay). For example, the specific service is a service in which terminal transmission data containing information that easily changes in a short time is transmitted. For example, the specific service is a service in which the position of the moving terminal station 3 is specified, a service in which the position of a mobile object of some kind is specified, or the like. For example, the specific service is a service for correctly obtaining the position of a ship on the ocean by a sensor.

As illustrated in FIG. 2, in the present embodiment, the base stations 4-1, which are base station devices for a specific service, are installed at a plurality of locations on the Earth. Not only the base stations 4-1 but also the base station 4-2, which is a base station device for general services, can receive terminal transmission data of a specific service. Thus, when the mobile relay station 2 is located in a range where communication with any one of the base stations 4-1 is possible or in a range where communication with the base station 4-2 is possible, terminal transmission data for a specific service can be transferred to the base station 4-1 or the base station 4-2.

On the other hand, the general services are services other than the specific service. For example, the general services include a service in which quick transfer of terminal transmission data is not required. For example, the general services include a service in which terminal transmission data containing information that does not easily change in a short time is transmitted. For example, the general services include a service in which receiving terminal transmission data only at a frequency approximately the same as the orbital frequency (e.g., twice a day) of a low earth orbit satellite is enough for trouble-free service. For example, the general services include a service that provides terminal transmission data indicating data for analyzing changes in tidal currents in one month, or a service that provides terminal transmission data indicating data for analyzing changes in ocean temperature in one month.

As illustrated in FIG. 2, in the present embodiment, the base station 4-2, which is a base station device for general services, is installed at only one location on the Earth. Thus, only when the mobile relay station 2 is located in a range where communication with the base station 4-2 is possible, terminal transmission data for general services can be transferred to the base station 4-2.

A configuration of each device will be described.

The mobile relay station 2 includes an antenna 21, a terminal communication unit 22, a data storage unit 23, a base station communication unit 24, and an antenna 25.

The terminal communication unit 22 includes a reception unit 221 (a receiver), a reception waveform recording unit 222, a determination unit 223, a specific service list storage unit 224, and an annunciation signal transmission unit 225.

The annunciation signal transmission unit 225 transmits, to the terminal station 3, a control signal (hereinafter referred to as an "annunciation signal") for announcing that transmission of terminal transmission data to its own mobile relay station 2 is permitted. The annunciation signal transmission unit 225 wirelessly transmits, from the antenna 21, a terminal downlink signal in which an annunciation signal is set.

The annunciation signal transmission unit 225 transmits a signal by LPWA. For LPWA, an optional wireless communication scheme such as LoRaWAN (registered trademark), Sigfox (registered trademark), LTE-M, or NB-IoT can be used. The annunciation signal transmission unit 225 determines a channel to be used for transmission of a terminal downlink signal by its own station on the basis of a method determined in advance in the wireless communication scheme to be used. The terminal station 3 starts transmitting a terminal uplink signal to the mobile relay station 2 in response to receiving an annunciation signal.

Note that the terminal communication unit 22 may store in advance a transmission start timing for each terminal station 3 calculated in advance on the basis of orbit information of the LEO satellite on which its own mobile relay station 2 is mounted and the position of each terminal station 3. The orbit information of the LEO is, for example, information from which the position, speed, direction of movement, and the like of the LEO satellite at an optional time can be obtained. A transmission time may be represented by, for example, an elapsed time from the transmission start timing. The annunciation signal transmission unit 225 may transmit, to each terminal station 3, a terminal downlink signal in which an annunciation signal is set, at the transmission start timing for each terminal station 3 stored in advance.

Note that the terminal communication unit 22 may store in advance terminal identification information for identifying the terminal stations 3 and position information indicating the positions of the terminal stations 3. The annunciation signal transmission unit 225 may determine the terminal station 3 to be notified on the basis of the current position of its own station and the positions of the terminal stations 3, and specify terminal identification information of the specified terminal station 3. The annunciation signal transmission unit 225 may include the specified terminal identification information in an annunciation signal and transmit the annunciation signal.

The specific service list storage unit 224 stores a specific service list. The specific service list is a list of preamble patterns given to terminal transmission data of a specific service. For example, in a case where there is a plurality of specific services, unique preamble patterns, each of which is associated with one of the specific services, may be included in the specific service list.

For example, the specific service list is transmitted in advance from any base station device among the plurality of the base stations 4-1 or the base station 4-2 to the mobile relay station 2, and is recorded in the specific service list storage unit 224. Note that the specific service list may be transmitted from a device other than the base stations 4-1 and the base station 4-2 to the mobile relay station 2. Alternatively, the specific service list may be recorded in the specific service list storage unit 224 in advance before the mobile relay station 2 starts to be operated.

Figure 3:
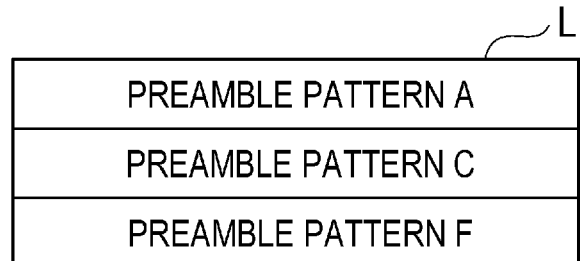
FIG. 3 is a diagram illustrating an example of a specific service list recorded in a mobile relay station according to the embodiment.

FIG. 3 is a diagram illustrating an example of a specific service list L recorded in the specific service list storage unit 224 of the mobile relay station 2 according to the first embodiment. As illustrated in FIG. 3, the specific service list L includes three preamble patterns (preamble pattern A, preamble pattern C, and preamble pattern F). That is, the specific service list L indicates that terminal transmission data to which the preamble pattern A, the preamble pattern C, or the preamble pattern F is given is terminal transmission data of a specific service.

The reception unit 221 receives a terminal uplink signal through the antenna 21. The terminal uplink signal is a signal transmitted from the terminal station 3 when that terminal station 3 receives an annunciation signal transmitted from the annunciation signal transmission unit 225. The terminal uplink signal contains terminal transmission data and a preamble pattern. The reception unit 221 outputs the received terminal uplink signal to the determination unit 223.

The determination unit 223 acquires the terminal uplink signal output from the reception unit 221. The determination unit 223 extracts the preamble pattern from the acquired terminal uplink signal. The determination unit 223 references a specific service list stored in the specific service list storage unit 224, and collates the preamble pattern extracted from the terminal uplink signal with preamble patterns included in the specific service list. The determination unit 223 outputs, to the reception waveform recording unit 222, a collation result indicating whether the same preamble pattern as the preamble pattern extracted from the terminal uplink signal is included in the specific service list, and the terminal uplink signal.

The reception waveform recording unit 222 samples a reception waveform of the terminal uplink signal acquired from the determination unit 223, and generates waveform data indicating a value obtained by the sampling. The reception waveform recording unit 222 writes, in the data storage unit 23, the reception time of the terminal uplink signal in the antenna 21 and reception waveform information in which the generated waveform data is set.

At this time, in a case where the acquired collation result indicates that the preamble pattern is included in the specific service list, the reception waveform recording unit 222 writes, in a priority queue 231 of the data storage unit 23, the reception time and the reception waveform information. On the other hand, in a case where the acquired collation result indicates that the preamble pattern is not included in the specific service list, the reception waveform recording unit 222 writes, in a general queue 232 of the data storage unit 23, the reception time and the reception waveform information.

The data storage unit 23 includes the priority queue 231 and the general queue 232. The priority queue 231 and the general queue 232 store the reception time and the reception waveform information written by the reception waveform recording unit 222.

The base station communication unit 24 transmits the reception waveform information to the base station 4-1 or the base station 4-2 by a base station downlink signal of an optional wireless communication scheme. The base station communication unit 24 includes a storage unit 241, a control unit 242, a transmission data modulation unit 243, and a transmission unit 244 (a transmitter).

The storage unit 241 stores a transmission start timing calculated in advance for each of the base stations 4-1 and the base station 4-2 on the basis of the orbit information of the LEO satellite on which the mobile relay station 2 is mounted and the positions of the base stations 4-1 and the base station 4-2. The orbit information of the LEO is information from which the position, speed, direction of movement, and the like of the LEO satellite at an optional time can be obtained. A transmission time may be represented by, for example, an elapsed time from the transmission start timing.

The control unit 242 controls the transmission data modulation unit 243 and the transmission unit 244 to transmit the reception waveform information to the base station 4-1 or the base station 4-2 at the transmission start timing stored in the storage unit 241.

The transmission data modulation unit 243 reads the reception waveform information from the data storage unit 23 as transmission data, and modulates the read transmission data to generate a base station downlink signal. The transmission unit 244 converts the base station downlink signal from an electrical signal into a radio signal, and transmits the radio signal from the antenna 25.

At this time, in a case where the transmission start timing is a timing to start transmission to the base station 4-1, which is a base station device for a specific service, the control unit 242 controls the transmission data modulation unit 243 and the transmission unit 244 to transmit, to the base station 4-1, the reception waveform information recorded in the priority queue 231. The transmission data modulation unit 243 reads the reception waveform information from the priority queue 231 as transmission data, and modulates the read transmission data to generate a base station downlink signal.

On the other hand, in a case where the transmission start timing is a timing to start transmission to the base station 4-2, which is a base station device for general services, the control unit 242 first controls the transmission data modulation unit 243 and the transmission unit 244 to transmit, to the base station 4-2, the reception waveform information recorded in the priority queue 231. The transmission data modulation unit 243 reads the reception waveform information from the priority queue 231 as transmission data, and modulates the read transmission data to generate a base station downlink signal. In a case where transmission of the reception waveform information recorded in the priority queue 231 has been completed, or in a case where no reception waveform information has been recorded in the priority queue 231, the control unit 242 controls the transmission data modulation unit 243 and the transmission unit 244 to transmit, to the base station 4-2, the reception waveform information recorded in the general queue 232. The transmission data modulation unit 243 reads the reception waveform information from the general queue 232 as transmission data, and modulates the read transmission data to generate a base station downlink signal.

In this manner, when a timing at which transmission to the base station 4-1, which is a base station device for a specific service, is possible arrives, the mobile relay station 2 extracts, from the priority queue 231, reception waveform information indicating terminal transmission data of a specific service, and transmits the reception waveform information to the base station 4-1. In addition, when a timing at which transmission to the base station 4-2, which is a base station device for general services, is possible arrives, the mobile relay station 2 first extracts, from the priority queue 231, reception waveform information indicating terminal transmission data of a specific service and transmits the reception waveform information to the base station 4-2, and then extracts, from the general queue 232, reception waveform information indicating terminal transmission data of general services and transmits the reception waveform information to the base station 4-2.

As described above, in the present embodiment, the base stations 4-1, which are base station devices for a specific service, are set at a plurality of locations on the Earth, and the base station 4-2, which is a base station device for general services, is set at only one location on the Earth. With the above configuration, terminal transmission data for a specific service is transmitted, preferentially over terminal transmission data of general services, to the base station device on the Earth.

The terminal station 3 includes a data storage unit 31, a transmission unit 32, one or more antennas 33, a reception unit 34, and a transmission control unit 35 (a transmission controller).

The data storage unit 31 stores sensor data, a preamble pattern, and the like. The sensor data is data generated by an IoT terminal having the terminal station 3 and transmitted from the terminal station 3 to the mobile relay station 2. The sensor data is, for example, environmental data indicating the temperature, humidity, tidal currents, or the like around the IoT terminal having the terminal station 3.

The reception unit 34 receives an annunciation signal transmitted from the mobile relay station 2. The reception unit 34 notifies the transmission control unit 35 that the annunciation signal has been received.

Upon being notified of the reception of the annunciation signal from the reception unit 34, the transmission control unit 35 controls the transmission unit 32 to start transmission of a terminal uplink signal.

The transmission unit 32 transmits a terminal uplink signal to the mobile relay station 2 under the control of the transmission control unit 35. The transmission unit 32 reads sensor data from the data storage unit 31 as terminal transmission data. In addition, the transmission unit 32 reads a preamble pattern from the data storage unit 31. The transmission unit 32 wirelessly transmits, from the antenna 33, a terminal uplink signal in which the terminal transmission data and the preamble pattern that have been read are set.

The transmission unit 32 transmits a signal by Low Power Wide Area (LPWA), for example. For LPWA, LoRaWAN (registered trademark), Sigfox (registered trademark), Long Term Evolution for Machines (LTE-M), Narrow Band (NB)-IoT, or any other wireless communication scheme can be used.

Alternatively, the transmission unit 32 may perform transmission with another terminal station 3 by time division multiplexing, orthogonal frequency division multiplexing (OFDM), or the like. The transmission unit 32 determines a channel to be used for transmission of a terminal uplink signal by its own station and a transmission start timing on the basis of a method determined in advance in the wireless communication scheme to be used. Alternatively, the transmission unit may perform beam formation of signals transmitted from a plurality of the antennas 33 on the basis of a method determined in advance in the wireless communication scheme to be used.

In the present embodiment, the base stations 4-1 and the base station 4-2 have similar configurations.

Each of the base stations 4-1 and the base station 4-2 includes an antenna 41, a reception unit 42, a base station signal reception processing unit 43, and a terminal signal reception processing unit 44.

The reception unit 42 converts a terminal downlink signal received through the antenna 41 into an electrical signal.

The base station signal reception processing unit 43 demodulates and decodes the reception signal converted into the electrical signal by the reception unit 42 to obtain reception waveform information. The base station signal reception processing unit 43 outputs the reception waveform information to the terminal signal reception processing unit 44.

The terminal signal reception processing unit 44 performs processing of receiving a terminal uplink signal indicated by the reception waveform information. At this time, the terminal signal reception processing unit 44 acquires terminal transmission data by performing reception processing by the wireless communication scheme used for transmission by the terminal station 3. The terminal signal reception processing unit 44 includes a terminal signal demodulation unit 441 and a terminal signal decoding unit 442.

The terminal signal demodulation unit 441 demodulates waveform data and outputs a symbol obtained by the demodulation to the terminal signal decoding unit 442. The terminal signal demodulation unit 441 may perform, on a signal indicated by waveform data, processing of compensating for a Doppler shift of a terminal uplink signal received by the antenna 21 of the mobile relay station 2, and then perform demodulation. The Doppler shift applied to the terminal uplink signal received by the antenna 21 is calculated in advance on the basis of the position of the terminal station 3 and the orbit information of the LEO on which the mobile relay station 2 is mounted.

The terminal signal decoding unit 442 decodes the symbol demodulated by the terminal signal demodulation unit 441 to obtain the terminal transmission data transmitted from the terminal station 3.

An operation of the wireless communication system 1 will be described.

Figure 4:
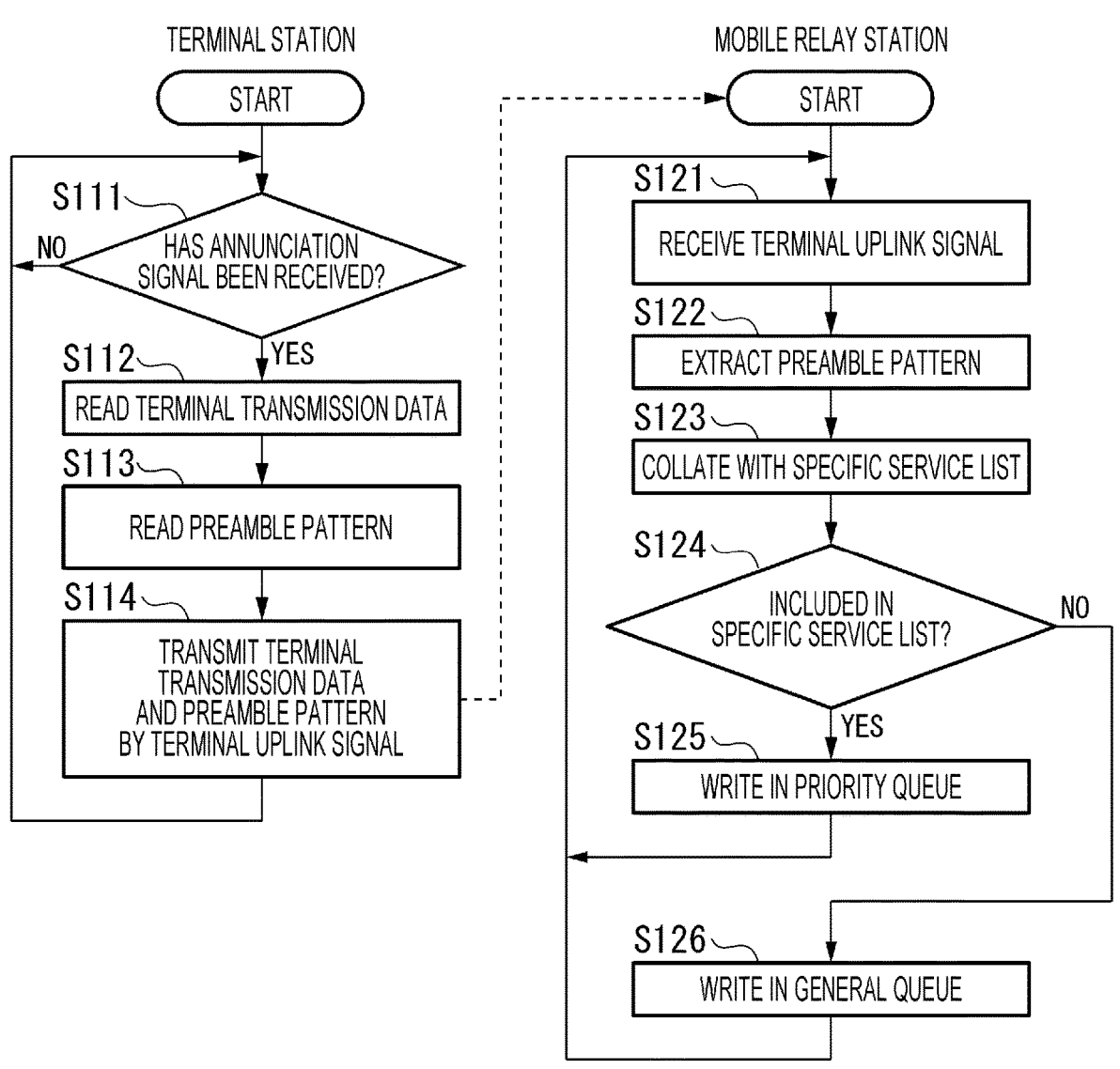
FIG. 4 is a flowchart illustrating processing of the wireless communication system according to the embodiment.

FIG. 4 is a flowchart illustrating processing of the wireless communication system 1 in a case where a terminal uplink signal is transmitted from the terminal station 3. The processing illustrated in the flowchart is started when the annunciation signal transmission unit 225 of the mobile relay station 2 transmits an annunciation signal to the terminal station 3. At this time, the terminal station 3 acquires data detected by a sensor (not illustrated) provided outside or inside, and writes the acquired data as sensor data in the data storage unit 31 as needed.

The reception unit 34 of the terminal station 3 waits for reception of an annunciation signal transmitted from the mobile relay station 2 (step S111). In a case where an annunciation signal has been received (step S111: YES), the reception unit 34 notifies the transmission control unit 35 that the annunciation signal has been received. Upon being notified of the reception of the annunciation signal from the reception unit 34, the transmission control unit 35 controls the transmission unit 32 to start transmission of a terminal uplink signal.

The transmission unit 32 reads sensor data from the data storage unit 31 as terminal transmission data (step S112). In addition, the transmission unit 32 reads a preamble pattern from the data storage unit 31 (step S113). The transmission unit 32 wirelessly transmits, from the antenna 33, a terminal uplink signal in which the terminal transmission data and the preamble pattern that have been read are set (step S114). The terminal station 3 repeats the processing from step S111.

The reception unit 221 of the mobile relay station 2 receives, through the antenna 21, a terminal uplink signal transmitted from the terminal station 3 (step S121). Depending on the wireless communication scheme of the transmission source terminal station 3, there are a case where terminal uplink signals are received from only one terminal station 3 in a time division manner at the same frequency and a case where terminal uplink signals are simultaneously received from a plurality of the terminal stations 3 at the same frequency. The reception unit 221 outputs the received terminal uplink signal to the determination unit 223.

The determination unit 223 acquires the terminal uplink signal output from the reception unit 221. The determination unit 223 extracts the preamble pattern from the acquired terminal uplink signal (step S122). The determination unit 223 references a specific service list stored in the specific service list storage unit 224, and collates the preamble pattern extracted from the terminal uplink signal with preamble patterns included in the specific service list (step S123).

The determination unit 223 outputs, to the reception waveform recording unit 222, a collation result indicating whether the same preamble pattern as the preamble pattern extracted from the terminal uplink signal is included in the specific service list, and the terminal uplink signal. The reception waveform recording unit 222 acquires the collation result and the terminal uplink signal output from the determination unit 223.

In a case where the acquired collation result indicates that the preamble pattern is included in the specific service list (step S124: YES), the reception waveform recording unit 222 writes, in the priority queue 231 of the data storage unit 23, the reception time and the reception waveform information (step S125). On the other hand, in a case where the acquired collation result indicates that the preamble pattern is not included in the specific service list (step S124: NO), the reception waveform recording unit 222 writes, in the general queue 232 of the data storage unit 23, the reception time and the reception waveform information (step S126). The mobile relay station 2 repeats the processing from step S121.

Figure 5:
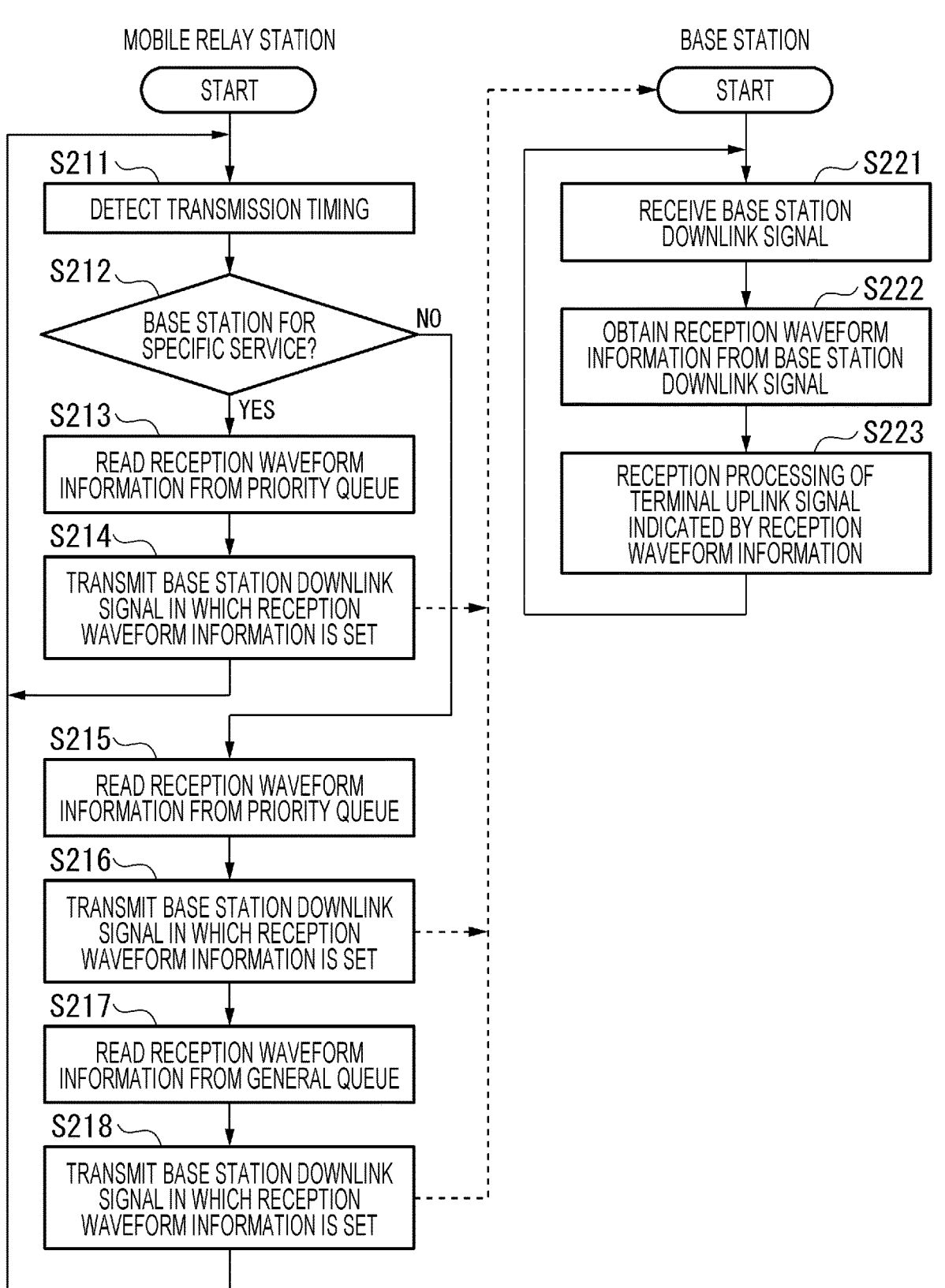
FIG. 5 is a flowchart illustrating processing of the wireless communication system according to the embodiment.

FIG. 5 is a flowchart illustrating processing of the wireless communication system 1 in a case where a base station downlink signal is transmitted from the mobile relay station 2. The processing illustrated in the flowchart is started in a state in which the control unit 242 included in the base station communication unit 24 of the mobile relay station 2 is waiting for a transmission start timing for any one of a plurality of the base stations 4-1 and the base station 4-2.

When detecting that it is the transmission start timing stored in the storage unit 241 (step S211), the control unit 242 included in the base station communication unit 24 of the mobile relay station 2 instructs the transmission data modulation unit 243 and the transmission unit 244 to transmit the reception waveform information. In a case where the transmission start timing is a timing to start transmission to the base station 4-1, which is a base station device for a specific service, (step S212: YES), the control unit 242 controls the transmission data modulation unit 243 and the transmission unit 244 to transmit, to the base station 4-1, the reception waveform information recorded in the priority queue 231.

The transmission data modulation unit 243 reads the reception waveform information from the priority queue 231 as transmission data (step S213). The transmission data modulation unit 243 modulates the read transmission data to generate a base station downlink signal. The transmission unit 244 converts the base station downlink signal in which the reception waveform information is set from an electrical signal into a radio signal, and transmits the radio signal from the antenna 25 (step S214). The mobile relay station 2 repeats the processing from step S211.

On the other hand, in a case where the transmission start timing is a timing to start transmission to the base station 4-2, which is a base station device for general services (step S212: NO), the control unit 242 first controls the transmission data modulation unit 243 and the transmission unit 244 to transmit, to the base station 4-2, the reception waveform information recorded in the priority queue 231. The transmission data modulation unit 243 reads the reception waveform information from the priority queue 231 as transmission data (step S215). The transmission data modulation unit 243 modulates the read transmission data to generate a base station downlink signal. The transmission unit 244 converts the base station downlink signal in which the reception waveform information is set from an electrical signal into a radio signal, and transmits the radio signal from the antenna 25 (step S216).

In a case where transmission of the reception waveform information recorded in the priority queue 231 has been completed, or in a case where no reception waveform information has been recorded in the priority queue 231, the control unit 242 controls the transmission data modulation unit 243 and the transmission unit 244 to transmit, to the base station 4-2, the reception waveform information recorded in the general queue 232. The transmission data modulation unit 243 reads the reception waveform information from the general queue 232 as transmission data (step S217). The transmission data modulation unit 243 modulates the read transmission data to generate a base station downlink signal. The transmission unit 244 converts the base station downlink signal in which the reception waveform information is set from an electrical signal into a radio signal, and transmits the radio signal from the antenna 25 (step S218). The mobile relay station 2 repeats the processing from step S211.

The antenna 41 of the base station 4-1 or the base station 4-2 receives the base station downlink signal from the mobile relay station 2 (step S221). The reception unit 42 converts the base station downlink signal received by the antenna 41 into a reception signal as an electrical signal, and outputs the reception signal to the base station signal reception processing unit 43. The base station signal reception processing unit 43 demodulates the reception signal, and decodes the demodulated reception signal (step S222). The base station signal reception processing unit 43 outputs, to the terminal signal reception processing unit 44, the reception waveform information obtained by the decoding.

The terminal signal reception processing unit 44 performs reception processing of a terminal uplink signal indicated by waveform data included in the reception waveform information (step S223). Specifically, the terminal signal demodulation unit 441 specifies the wireless communication scheme used by the terminal station 3 to transmit the terminal uplink signal on the basis of information specific to the wireless communication scheme included in the reception signal indicated by the waveform data. The terminal signal demodulation unit 441 demodulates the reception signal indicated by the waveform data in accordance with the specified wireless communication scheme, and outputs a symbol obtained by the demodulation to the terminal signal decoding unit 442. The terminal signal decoding unit 442 decodes the symbol input from the terminal signal demodulation unit 441 by the specified wireless communication scheme to obtain the terminal transmission data transmitted from the terminal station 3.

The terminal signal decoding unit 442 can also use a decoding method that involves a large computational load, such as successive interference cancellation (SIC). A base station 4a-1 or a base station 4a-2 repeats the processing from step S221.

As described above, in the wireless communication system 1 according to the present embodiment, the terminal station 3 transmits, to the mobile relay station 2, a terminal uplink signal indicating data in which a predetermined preamble pattern has been given to transmission data. The mobile relay station 2 stores a specific service list L, and collates the preamble pattern included in the terminal uplink signal with the preamble patterns included in the specific service list L. The mobile relay station 2 sorts and records the transmission data included in the terminal uplink signal into either the priority queue 231 or the general queue 232 in accordance with a result of the collation. At a timing at which the mobile relay station 2 can communicate with the base stations 4-1 and the base station 4-2, the mobile relay station 2 transmits signals indicating the transmission data recorded in the priority queue 231 and the general queue 232 queue to the base station 4-1 or the base station 4-2, while prioritizing the transmission data recorded in the priority queue 231.

With such a configuration, the wireless communication system 1 does not need to use a plurality of satellite channels, and does not require the communication devices on both of the transmission side and the reception side (terminal station 3 side and base station 4-1 or 4-2 side) to have a mechanism capable of simultaneously transmitting and receiving a plurality of carriers (carrier waves). In addition, with such a configuration, for example, the wireless communication system 1 can transmit transmission data while prioritizing a specific service in which more quick transfer (with less transfer delay) of terminal transmission data to a base station device is desired. Thus, the wireless communication system 1 according to the present embodiment can reduce delays in data transfer while preventing complication of the device.

In the configuration described above, the mobile relay station 2 according to the present embodiment holds the specific service list L, which is a list of preamble patterns to be sorted into the priority queue 231. However, the configuration is not limited to this configuration, and, for example, the mobile relay station 2 may hold a list (hereinafter referred to as a "priority terminal ID list") of terminal identifiers (IDs) to be sorted into the priority queue 231.

Here, the terminal IDs are identification information for identifying each terminal station 3.

In this case, when receiving an annunciation signal, the terminal station 3 may transmit, to the mobile relay station 2, a terminal uplink signal in which terminal transmission data and a terminal ID for identifying the terminal station 3 are set. Then, the mobile relay station 2 may extract the terminal ID from the received terminal uplink signal, and collate the extracted terminal ID with the terminal IDs included in the priority terminal ID list. In a case where the extracted terminal ID is included in the priority terminal ID list, the mobile relay station 2 may write the reception waveform information into the priority queue 231.

Second Embodiment

In the present embodiment, a mobile relay station transmits base station downlink signals through a plurality of antennas. Hereinafter, differences from the first embodiment will be mainly described by using, as an example, a case of using Multiple Input Multiple Output (MIMO) to transmit base station downlink signals.

Figure 6:
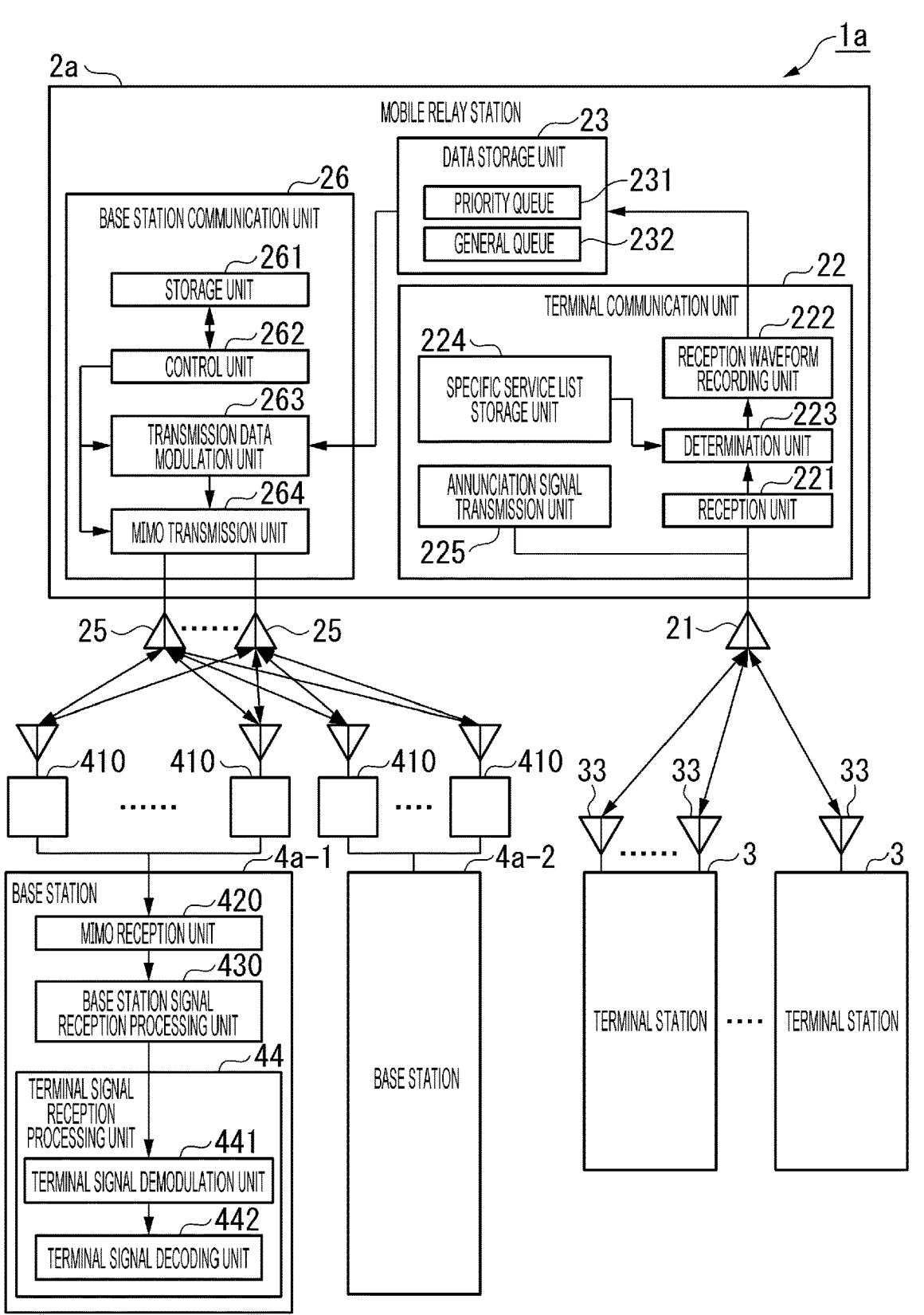
FIG. 6 is a configuration diagram of a wireless communication system according to a second embodiment of the present invention.

FIG. 6 is a configuration diagram of a wireless communication system 1a according to a second embodiment. In the drawing, the same components as those of the wireless communication system 1 according to the first embodiment illustrated in FIG. 1 are denoted by the same reference numerals, and description thereof will be omitted. The wireless communication system 1a includes a mobile relay station 2a, a terminal station 3, a base station 4a-1, and a base station 4a-2. Information transmitted from each one of a plurality of the terminal stations 3 is transmitted via the mobile relay station 2a and collected by the base station 4a-1 or the base station 4a-2.

The numbers of the mobile relay stations 2a, the terminal stations 3, the base stations 4a-1, and the base stations 4a-2 included in the wireless communication system 1a are optional, in which the number of the terminal stations 3 is assumed to be large, and the number of the base stations 4a-1 is assumed to be two or more. In the present embodiment, the base station 4a-1 is a base station device for a specific service, and the base station 4a-2 is a base station device for general services.

The mobile relay station 2a includes an antenna 21, a terminal communication unit 22, a data storage unit 23, a base station communication unit 26, and a plurality of antennas 25.

The base station communication unit 26 transmits reception waveform information to the base station 4a-1 or 4a-2 by MIMO. The base station communication unit 26 includes a storage unit 261, a control unit 262, a transmission data modulation unit 263, and a MIMO transmission unit 264.

The storage unit 261 stores a transmission start timing calculated in advance on the basis of orbit information of an LEO satellite on which the mobile relay station 2a is mounted and the position of the base station 4a-1 or the base station 4a-2. Furthermore, the storage unit 261 stores in advance a weight for each transmission time of a base station downlink signal transmitted from each antenna 25. The weight for each transmission time is calculated on the basis of the orbit information of the LEO satellite and the position of each antenna station 410 included in the base station 4a-1 or the base station 4a-2. Note that a fixed weight may be used regardless of the transmission time.

The control unit 262 controls the transmission data modulation unit 263 and the MIMO transmission unit 264 to transmit the reception waveform information to the base station 4a-1 or 4a-2 at the transmission start timing stored in the storage unit 261. Furthermore, the control unit 262 instructs the MIMO transmission unit 264 on the weight for each transmission time read from the storage unit 261.

The transmission data modulation unit 263 reads the reception waveform information from the data storage unit 23 as transmission data, converts the read transmission data into a parallel signal, and then modulates the parallel signal.

The MIMO transmission unit 264 uses the weight instructed by the control unit 262 to weight the modulated parallel signal, and generates a base station downlink signal to be transmitted from each antenna 25. The MIMO transmission unit 264 transmits the generated base station downlink signals from the antennas 25 by MIMO.

At this time, in a case where the transmission start timing is a timing to start transmission to the base station 4a-1, which is a base station device for a specific service, the control unit 262 controls the transmission data modulation unit 263 and the MIMO transmission unit 264 to transmit, to the base station 4a-1, the reception waveform information recorded in a priority queue 231. The control unit 262 instructs the MIMO transmission unit 264 on the weight for each transmission time read from the priority queue 231. The transmission data modulation unit 263 reads the reception waveform information from the priority queue 231 as transmission data, converts the read transmission data into a parallel signal, and then modulates the parallel signal.

On the other hand, in a case where the transmission start timing is a timing to start transmission to the base station 4a-2, which is a base station device for general services, the control unit 262 first controls the transmission data modulation unit 263 and the MIMO transmission unit 264 to transmit, to the base station 4a-2, the reception waveform information recorded in the priority queue 231. The control unit 262 instructs the MIMO transmission unit 264 on the weight for each transmission time read from the priority queue 231. The transmission data modulation unit 263 reads the reception waveform information from the priority queue 231 as transmission data, converts the read transmission data into a parallel signal, and then modulates the parallel signal.

In a case where transmission of the reception waveform information recorded in the priority queue 231 has been completed, or in a case where no reception waveform information has been recorded in the priority queue 231, a control unit 242 instructs the MIMO transmission unit 264 on the weight for each transmission time read from a general queue 232. The transmission data modulation unit 263 reads the reception waveform information from the general queue 232 as transmission data, converts the read transmission data into a parallel signal, and then modulates the parallel signal.

In the present embodiment, the base station 4a-1 and the base station 4a-2 have similar configurations.

Each of the base station 4a-1 and the base station 4a-2 includes a plurality of the antenna stations 410, a MIMO reception unit 420, a base station signal reception processing unit 430, and a terminal signal reception processing unit 44. The antenna stations 410 are arranged at positions away from each other so as to increase the difference in arrival angle of signals from each one of a plurality of the antennas 25 of the mobile relay station 2a. Each antenna station 410 converts a base station downlink signal received from the mobile relay station 2a into an electrical signal, and outputs the electrical signal to the MIMO reception unit 420.

The MIMO reception unit 420 aggregates the base station downlink signals received from the plurality of antenna stations 410. The MIMO reception unit 420 stores a weight for each of the reception times for the base station downlink signals received by each antenna station 410 on the basis of the orbit information of the LEO satellite and the position of each antenna station 410. The MIMO reception unit 420 multiplies the base station downlink signal input from each antenna station 410 by a weight corresponding to the reception time of the base station downlink signal, and combines the reception signals multiplied by the weight. The same weight may be used regardless of the reception time. The base station signal reception processing unit 430 demodulates and decodes the combined reception signal to obtain reception waveform information. The base station signal reception processing unit 430 outputs the reception waveform information to the terminal signal reception processing unit 44.

An operation of the wireless communication system 1*a* will be described.

Processing of the wireless communication system 1*a* in a case where a terminal uplink signal is transmitted from the terminal station 3 is similar to the processing of the wireless communication system 1 of the first embodiment illustrated in FIG. 4.

FIG. 7 is a flowchart illustrating processing of the wireless communication system 1*a* in a case where a base station downlink signal is transmitted from the mobile relay station 2*a*. The processing illustrated in the flowchart is started in a state in which the control unit 262 included in the base station communication unit 26 of the mobile relay station 2*a* is waiting for a transmission start timing for any one of a plurality of the base stations 4*a*-1 and the base station 4*a*-2.

When detecting that it is the transmission start timing stored in the storage unit 261 (step S311), the control unit 262 included in the base station communication unit 26 of the mobile relay station 2*a* instructs the transmission data modulation unit 263 and the MIMO transmission unit 264 to transmit the reception waveform information. In a case where the transmission start timing is a timing to start transmission to the base station 4*a*-1, which is a base station device for a specific service (step S312: YES), the control unit 262 controls the transmission data modulation unit 263 and the MIMO transmission unit 264 to transmit, to the base station 4*a*-1, the reception waveform information recorded in the priority queue 231.

The transmission data modulation unit 263 reads the reception waveform information accumulated in the priority queue 231 as transmission data (step S313), performs parallel conversion on the read transmission data, and then modulates the transmission data. The MIMO transmission unit 264 uses the weight instructed by the control unit 262 to weight the transmission data modulated by the transmission data modulation unit 263, and generates a base station downlink signal, which is a transmission signal to be transmitted from each antenna 25. The MIMO transmission unit 264 transmits the generated base station downlink signals from the antennas 25 by MIMO (step S314). The mobile relay station 2*a* repeats the processing from step S311.

On the other hand, in a case where the transmission start timing is a timing to start transmission to the base station 4*a*-2, which is a base station device for general services (step S312: NO), the control unit 262 first controls the transmission data modulation unit 263 and the MIMO transmission unit 264 to transmit, to the base station 4*a*-2, the reception waveform information recorded in the priority queue 231.

The transmission data modulation unit 263 reads the reception waveform information accumulated in the priority queue 231 as transmission data (step S315), performs parallel conversion on the read transmission data, and then modulates the transmission data. The MIMO transmission unit 264 uses the weight instructed by the control unit 262 to weight the transmission data modulated by the transmission data modulation unit 263, and generates a base station downlink signal, which is a transmission signal to be transmitted from each antenna 25. The MIMO transmission unit 264 transmits the generated base station downlink signals from the antennas 25 by MIMO (step S316).

In a case where transmission of the reception waveform information recorded in the priority queue 231 has been completed, or in a case where no reception waveform information has been recorded in the priority queue 231, the control unit 262 controls the transmission data modulation unit 263 and the MIMO transmission unit 264 to transmit, to the base station 4*a*-2, the reception waveform information recorded in the general queue 232.

The transmission data modulation unit 263 reads the reception waveform information accumulated in the general queue 232 as transmission data (step S317), performs parallel conversion on the read transmission data, and then modulates the transmission data. The MIMO transmission unit 264 uses the weight instructed by the control unit 262 to weight the transmission data modulated by the transmission data modulation unit 263, and generates a base station downlink signal, which is a transmission signal to be transmitted from each antenna 25. The MIMO transmission unit 264 transmits the generated base station downlink signals from the antennas 25 by MIMO (step S318). The mobile relay station 2*a* repeats the processing from step S311.

The antenna stations 410 of the base station 4*a*-1 or the antenna stations 410 of the base station 4*a*-2 receive the base station downlink signals from the mobile relay station 2*a* (step S321). The antenna stations 410 output, to the MIMO reception unit 420, reception signals obtained by converting the received base station downlink signals into electrical signals. The MIMO reception unit 420 synchronizes the timings of the reception signals received from the antenna stations 410. The MIMO reception unit 420 multiplies the reception signals received by the antenna stations 410 by a weight, and adds up the reception signals. The base station signal reception processing unit 430 demodulates the added up reception signal and decodes the demodulated reception signal (step S322). The base station signal reception processing unit 430 outputs, to the terminal signal reception processing unit 44, the reception waveform information obtained by the decoding.

The terminal signal reception processing unit 44 performs processing of receiving a terminal uplink signal indicated by waveform data included in the reception waveform information in a similar manner to the processing of step S223 in the processing flow of the first embodiment illustrated in FIG. 5 (step S323). That is, a terminal signal demodulation unit 441 specifies the wireless communication scheme used by the terminal station 3 to transmit the terminal uplink signal on the basis of information specific to the wireless communication scheme included in the reception signal indicated by the waveform data.

The terminal signal demodulation unit 441 demodulates the reception signal indicated by the waveform data in accordance with the specified wireless communication scheme, and outputs a symbol obtained by the demodulation to a terminal signal decoding unit 442. The terminal signal decoding unit 442 decodes the symbol input from the terminal signal demodulation unit 441 by the specified wireless communication scheme to obtain the terminal transmission data transmitted from the terminal station 3. The terminal signal decoding unit 442 can also use a decoding method that involves a large computational load, such as SIC. The base station 4a-1 or the base station 4a-2 repeats the processing from step S321.

As described above, in the wireless communication system 1a according to the present embodiment, the terminal station 3 transmits, to the mobile relay station 2a, a terminal uplink signal indicating data in which a predetermined preamble pattern has been given to transmission data. The mobile relay station 2a stores a specific service list L, and collates the preamble pattern included in the terminal uplink signal with the preamble patterns included in the specific service list L. The mobile relay station 2a sorts and records the transmission data included in the terminal uplink signal into either the priority queue 231 or the general queue 232 in accordance with a result of the collation. At a timing at which the mobile relay station 2a can communicate with the base station 4a-1 and the base station 4a-2, the mobile relay station 2a transmits signals indicating the transmission data recorded in the priority queue 231 and the general queue 232 queue to the base station 4a-1 or the base station 4a-2, while prioritizing the transmission data recorded in the priority queue 231.

With such a configuration, the wireless communication system 1a does not need to use a plurality of satellite channels, and does not require the communication devices on both of the transmission side and the reception side (terminal station 3 side and base station 4a-1 or 4a-2 side) to have a mechanism capable of simultaneously transmitting and receiving a plurality of carriers (carrier waves). In addition, with such a configuration, for example, the wireless communication system 1a can transmit transmission data while prioritizing a specific service in which more quick transfer (with less transfer delay) of terminal transmission data to a base station device is desired. Thus, the wireless communication system 1a according to the present embodiment can reduce delays in data transfer while preventing complication of the device.

According to the embodiment described above, the mobile relay station 2a can collectively transmit, with good quality in a short time, data received from the plurality of terminal stations 3 and accumulated, at a timing at which the mobile relay station 2a can communicate with the base stations 4a-1 and 4a-2.

Third Embodiment

In the present embodiment, a mobile relay station receives terminal uplink signals through a plurality of antennas. In the description below, differences from the second embodiment will be mainly described.

Figure 8:
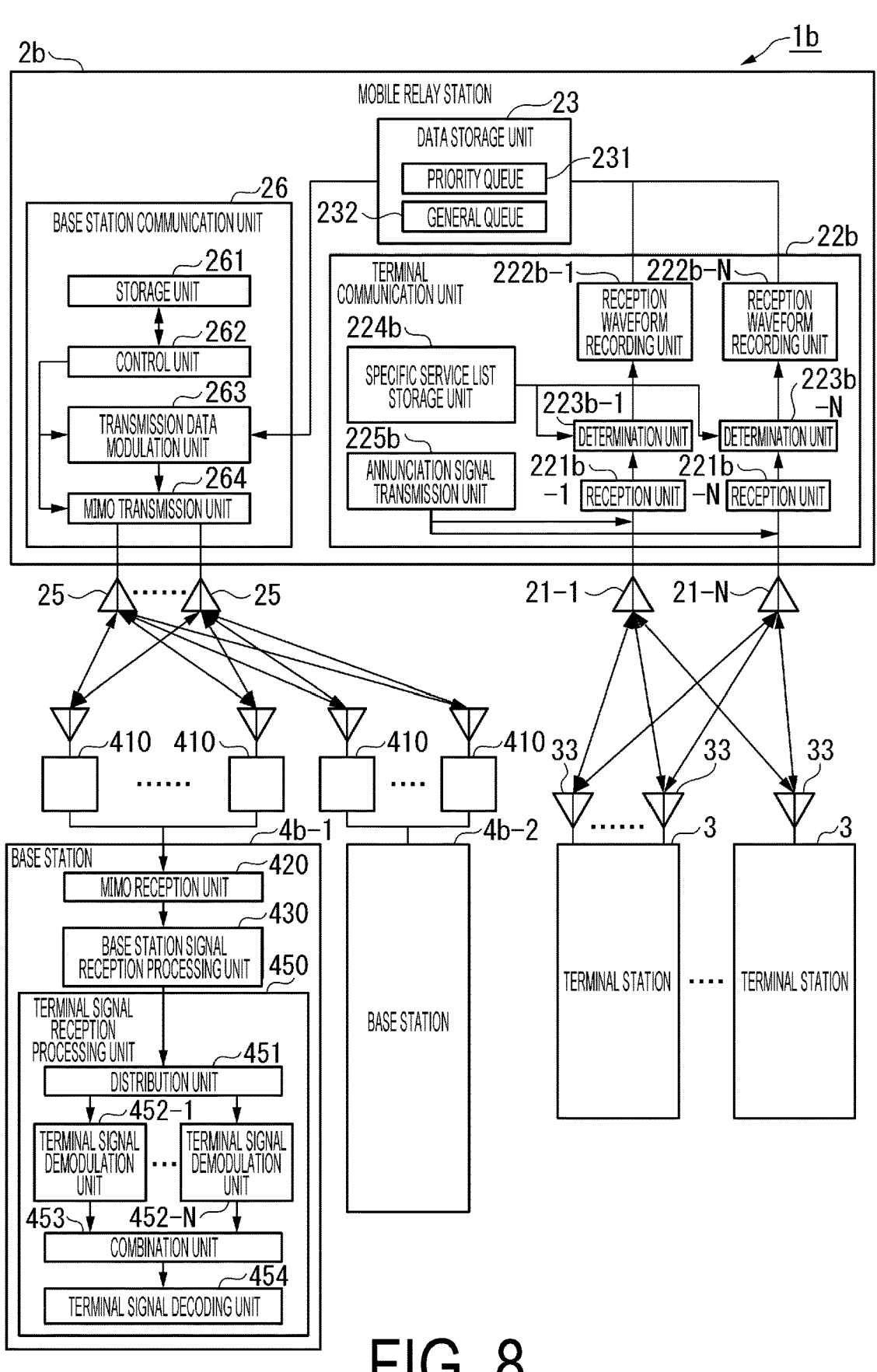
FIG. 8 is a configuration diagram of a wireless communication system according to a third embodiment of the present invention.

FIG. 8 is a configuration diagram of a wireless communication system 1b according to a third embodiment. In the drawing, the same components as those of the wireless communication system 1a according to the second embodiment illustrated in FIG. 6 are denoted by the same reference numerals, and description thereof will be omitted. The wireless communication system 1b includes a mobile relay station 2b, a terminal station 3, a base station 4b-1, and a base station 4b-2. Information transmitted from each one of a plurality of the terminal stations 3 is transmitted via mobile relay station 2b and collected by the base station 4b-1 or the base station 4b-2.

The numbers of the mobile relay stations 2b, the terminal stations 3, the base stations 4b-1, and the base stations 4b-2 included in the wireless communication system 1b are optional, in which the number of the terminal stations 3 is assumed to be large, and the number of the base stations 4b-1 is assumed to be two or more. In the present embodiment, the base station 4b-1 is a base station device for a specific service, and the base station 4b-2 is a base station device for general services.

The mobile relay station 2b includes N antennas 21 (N is an integer of 2 or more), a terminal communication unit 22b, a data storage unit 23, a base station communication unit 26, and a plurality of antennas 25. Each of the N antennas 21 is referred to as one of antennas 21-1 to 21-N.

The terminal communication unit 22b includes N reception units 221b, N reception waveform recording units 222b, and N determination units 223b. The N reception units 221b are referred to as reception units 221b-1 to 221b-N, the N reception waveform recording units 222b are referred to as reception waveform recording units 222b-1 to 222b-N, and the N determination units 223b are referred to as determination units 223b-1 to 223bN.

The reception unit 221b-n (n is an integer between 1 and N) receives a terminal uplink signal through the antenna 21-n. The terminal uplink signal is a signal transmitted from the terminal station 3 when that terminal station 3 receives an annunciation signal transmitted from an annunciation signal transmission unit 225b. The terminal uplink signal contains terminal transmission data and a preamble pattern. The reception unit 221b-n outputs the received terminal uplink signal to the determination unit 223b-n (n is an integer between 1 and N).

The determination unit 223b-n acquires the terminal uplink signal output from the reception unit 221b-n. The determination unit 223b-n extracts a preamble pattern from the acquired terminal uplink signal. The determination unit 223b-n references a specific service list stored in a specific service list storage unit 224b, and collates the preamble pattern extracted from the terminal uplink signal with preamble patterns included in the specific service list. The determination unit 223b-n outputs, to the reception waveform recording unit 222b-n (n is an integer between 1 and N), a collation result indicating whether the same preamble pattern as the preamble pattern extracted from the terminal uplink signal is included in the specific service list, and the terminal uplink signal.

The reception waveform recording unit 222b-n samples a reception waveform of the terminal uplink signal received by the reception unit 221b-n, and generates waveform data indicating a value obtained by the sampling. The reception waveform recording unit 222b-n writes, in the data storage unit 23, an antenna identifier of the antenna 21-n, the reception time of the terminal uplink signal in the antenna 21-n, and reception waveform information in which the generated waveform data is set. The antenna identifier is information for specifying the antenna 21-n. The data storage unit 23 stores the reception waveform information including the waveform data of the terminal uplink signal received by each of the antennas 21-1 to 21-N.

At this time, in a case where the acquired collation result indicates that the preamble pattern is included in the specific service list, the reception waveform recording unit 222b-n writes, in a priority queue 231 of the data storage unit 23, the antenna identifier, the reception time, and the reception waveform information. On the other hand, in a case where the acquired collation result indicates that the preamble pattern is not included in the specific service list, a reception waveform recording unit 222 writes, in a general queue 232 of the data storage unit 23, the antenna identifier, the reception time, and the reception waveform information.

In the present embodiment, the base station 4b-1 and the base station 4b-2 have similar configurations.

Each of the base station 4*b*-1 and the base station 4*b*-2 includes a plurality of antenna stations 410, a MIMO reception unit 420, a base station signal reception processing unit 430, and a terminal signal reception processing unit 450.

The terminal signal reception processing unit 450 performs processing of receiving a terminal uplink signal indicated by the reception waveform information. At this time, the terminal signal reception processing unit 450 acquires terminal transmission data by performing reception processing by the wireless communication scheme used for transmission by the terminal station 3. The terminal signal reception processing unit 450 includes a distribution unit 451, N terminal signal demodulation units 452, a combination unit 453, and a terminal signal decoding unit 454. Each of the N terminal signal demodulation units 452 is referred to as one of terminal signal demodulation units 452-1 to 452-N.

The distribution unit 451 reads waveform data of the same reception time from the reception waveform information, and outputs the read waveform data to the terminal signal demodulation units 452-1 to 452-N in accordance with the antenna identifier associated with the waveform data. That is, the distribution unit 451 outputs, to the terminal signal demodulation unit 452-*n*, the waveform data associated with the antenna identifier of the antenna 21-*n*.

Each of the terminal signal demodulation units 452-1 to 452-N demodulates a signal indicated by the waveform data, and outputs a symbol obtained by the demodulation to the combination unit 453. The terminal signal demodulation unit 452-*n* may perform, on the signal indicated by the waveform data, processing of compensating for a Doppler shift of the terminal uplink signal received by the antenna 21-*n* of the mobile relay station 2, and then perform demodulation. The Doppler shift applied to the terminal uplink signal received by each antenna 21-*n* is calculated in advance on the basis of the position of the terminal station 3 and the orbit information of the LEO on which the mobile relay station 2*b* is mounted.

The combination unit 453 adds and combines the symbols input from each of the terminal signal demodulation units 452-1 to 452-N, and outputs the added and combined symbol to the terminal signal decoding unit 454. The terminal signal decoding unit 454 decodes the added and combined symbol to obtain the terminal transmission data transmitted from the terminal station 3.

An operation of the wireless communication system 1*b* will be described.

FIG. 9 is a flowchart illustrating processing of the wireless communication system 1*b* in a case where a terminal uplink signal is transmitted from the terminal station 3. The processing illustrated in the flowchart is started when the annunciation signal transmission unit 225*b* of the mobile relay station 2*b* transmits an annunciation signal to the terminal station 3. At this time, the terminal station 3 acquires data detected by a sensor (not illustrated) provided outside or inside, and writes the acquired data as sensor data in a data storage unit 31 as needed.

In FIG. 9, the same types of processing as those in the processing flow of the first embodiment illustrated in FIG. 4 are denoted by the same reference numerals. The terminal station 3 performs processing similar to the processing of steps S111 to S114 in the processing flow of the first embodiment illustrated in FIG. 4. Note that the terminal station 3 may perform transmission with another terminal station 3 by time division multiplexing, OFDM, MIMO, or the like.

The reception units 221*b*-1 to 221*b*-N of the mobile relay station 2*b* receive, through the antenna 21-*n*, a terminal uplink signal transmitted from the terminal station 3 (step S421). Depending on the wireless communication scheme of the transmission source terminal station 3, there are a case where terminal uplink signals are received from only one terminal station 3 in a time division manner at the same frequency and a case where terminal uplink signals are simultaneously received from a plurality of the terminal stations 3 at the same frequency. The reception unit 221*b*-*n* outputs the received terminal uplink signal to the determination unit 223*b*-*n*.

The determination unit 223*b*-*n* acquires the terminal uplink signal output from a reception unit 221. The determination unit 223*b*-*n* extracts a preamble pattern from the acquired terminal uplink signal (step S422). The determination unit 223*b*-*n* references a specific service list stored in the specific service list storage unit 224*b*, and collates the preamble pattern extracted from the terminal uplink signal with preamble patterns included in the specific service list (step S423).

The determination unit 223*b*-*n* outputs, to the reception waveform recording unit 222*b*-*n*, a collation result indicating whether the same preamble pattern as the preamble pattern extracted from the terminal uplink signal is included in the specific service list, and the terminal uplink signal. The reception waveform recording unit 222*b*-*n* acquires the collation result and the terminal uplink signal output from the determination unit 223*b*-*n*. The reception waveform recording unit 222*b*-*n* samples a reception waveform of the terminal uplink signal received by the reception unit 221*b*-*n*, and generates waveform data indicating a value obtained by the sampling.

In a case where the acquired collation result indicates that the preamble pattern is included in the specific service list (step S424: YES), the reception waveform recording unit 222*b*-*n* writes, in the priority queue 231 of the data storage unit 23, the antenna identifier of the antenna 21-*n*, the reception time of the terminal uplink signal in the antenna 21-*n*, and reception waveform information in which the generated waveform data is set (step S425). On the other hand, in a case where the acquired collation result indicates that the preamble pattern is not included in the specific service list (step S424: NO), the reception waveform recording unit 222*b*-*n* writes, in the general queue 232 of the data storage unit 23, the antenna identifier of the antenna 21-*n*, the reception time of the terminal uplink signal in the antenna 21-*n*, and reception waveform information in which the generated waveform data is set (step S426). The mobile relay station 2 repeats the processing from step S421.

The processing of the wireless communication system 1*b* in a case of transmitting a base station downlink signal from the mobile relay station 2*b* is similar to the processing flow of the second embodiment illustrated in FIG. 7, except for the following processing. That is, in step S323, the terminal signal reception processing unit 450 performs processing of receiving a terminal uplink signal indicated by the reception waveform information.

Specifically, the distribution unit 451 reads waveform data of the same reception time from the reception waveform information, and outputs the read waveform data to the terminal signal demodulation units 452-1 to 452-N in accordance with the antenna identifier associated with the waveform data. Each of the terminal signal demodulation units 452-1 to 452-N specifies the wireless communication scheme used by the terminal station 3 to transmit the terminal uplink signal on the basis of information specific to the wireless communication scheme included in the reception signal indicated by the waveform data. The terminal signal demodulation units 452-1 to 452-N demodulate the reception signal indicated by the waveform data in accordance with the specified wireless communication scheme, and output a symbol obtained by the demodulation to the combination unit 453.

The combination unit 453 adds and combines the symbols input from each of the terminal signal demodulation units 452-1 to 452-N. As a result of the addition and combination, the signals transmitted by the terminal station 3 are emphasized due to correlation, but influence of randomly added noise is reduced. Thus, a diversity effect can be obtained for terminal uplink signals that the mobile relay station 2b has simultaneously received from only one terminal station 3. In addition, terminal uplink signals simultaneously received by the mobile relay station 2b from a plurality of the terminal stations 3 correspond to performing MIMO communication. The combination unit 453 outputs the added and combined symbol to the terminal signal decoding unit 454.

The terminal signal decoding unit 454 decodes, by the specified wireless communication scheme, the symbol added and combined by the combination unit 453 to obtain the terminal transmission data transmitted from the terminal station 3. The terminal signal decoding unit 454 can also use a decoding method that involves a large computational load, such as SIC.

As described above, in the wireless communication system 1b according to the present embodiment, the terminal station 3 transmits, to the mobile relay station 2b, a terminal uplink signal indicating data in which a predetermined preamble pattern has been given to transmission data. The mobile relay station 2b stores a specific service list L, and collates the preamble pattern included in the terminal uplink signal with the preamble patterns included in the specific service list L. The mobile relay station 2b sorts and records the transmission data included in the terminal uplink signal into either the priority queue 231 or the general queue 232 in accordance with a result of the collation. At a timing at which the mobile relay station 2b can communicate with the base station 4b-1 and the base station 4b-2, the mobile relay station 2b transmits signals indicating the transmission data recorded in the priority queue 231 and the general queue 232 queue to the base station 4b-1 or the base station 4b-2, while prioritizing the transmission data recorded in the priority queue 231.

With such a configuration, the wireless communication system 1b does not need to use a plurality of satellite channels, and does not require the communication devices on both of the transmission side and the reception side (terminal station 3 side and base station 4b-1 or 4b-2 side) to have a mechanism capable of simultaneously transmitting and receiving a plurality of carriers (carrier waves). In addition, with such a configuration, for example, the wireless communication system 1b can transmit transmission data while prioritizing a specific service in which more quick transfer (with less transfer delay) of terminal transmission data to a base station device is desired. Thus, the wireless communication system 1b according to the present embodiment can reduce delays in data transfer while preventing complication of the device.

According to the embodiment described above, the mobile relay station 2b receives a terminal uplink signal received from the terminal station 3 by diversity reception, MIMO reception, or the like. Thus, the link budget between the mobile relay station 2b and the terminal station 3 can be improved.

According to the embodiment described above, the mobile relay station 2b can collectively transmit, with good quality in a short time, data received from the plurality of terminal stations 3 and accumulated, at a timing at which the mobile relay station 2b can communicate with the base stations 4b-1 and 4b-2.

Fourth Embodiment

In the wireless communication systems 1, 1a, and 1b according to the first to third embodiments described above, the mobile relay stations 2, 2a, and 2b extract a preamble pattern from a terminal uplink signal received from the terminal station 3, and sort reception waveform information into either the priority queue 231 or the general queue 232 in accordance with a result of collation of the extracted preamble pattern with preamble patterns included in the specific service list L.

On the other hand, in a wireless communication system 1c according to a fourth embodiment described below, a mobile relay station 2c holds a priority terminal ID list. The priority terminal ID list is a list of terminal IDs of terminal stations 3c that transmit terminal uplink signals having reception waveform information to be sorted into a priority queue 231. Here, the terminal IDs are identification information for identifying each terminal station 3. The mobile relay station 2c transmits an annunciation signal to the terminal station 3c, the annunciation signal including at least one terminal ID included in the priority terminal ID list. The terminal station 3c that has received the annunciation signal collates the terminal ID included in the annunciation signal with the terminal ID given in advance to the terminal station 3c, and transmits, to the mobile relay station 2c, a terminal uplink signal in which terminal transmission data is set in accordance with a result of the collation.

Hereinafter, details of the configuration of the wireless communication system 1c according to the fourth embodiment will be described, focusing on differences from the first embodiment.

Figure 10:
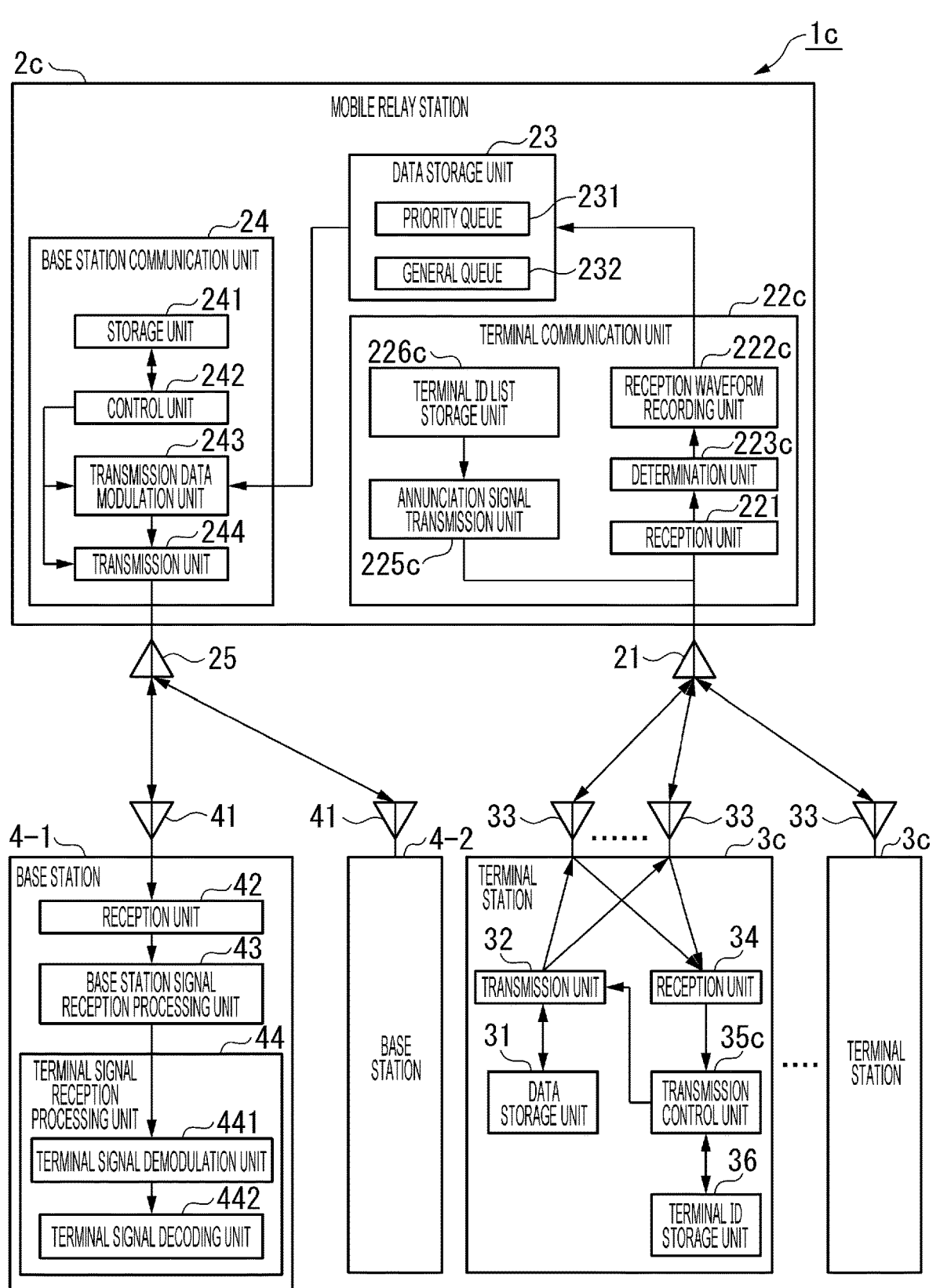
FIG. 10 is a configuration diagram of a wireless communication system according to a fourth embodiment of the present invention.

FIG. 10 is a configuration diagram of the wireless communication system 1c according to the fourth embodiment. The wireless communication system 1c includes the mobile relay station 2c, the terminal station 3c, a base station 4-1, and a base station 4-2. Information transmitted from each one of a plurality of the terminal stations 3c is transmitted via the mobile relay station 2c and collected by the base station 4-1 or the base station 4-2.

A configuration of each device will be described.

The mobile relay station 2c includes an antenna 21, a terminal communication unit 22c, a data storage unit 23, a base station communication unit 24, and an antenna 25.

The terminal communication unit 22c includes a reception unit 221, a reception waveform recording unit 222c, a determination unit 223c, an annunciation signal transmission unit 225c, and a terminal ID list storage unit 226c.

The terminal ID list storage unit 226c (terminal identification information list storage) stores a priority terminal ID list in advance. As described above, the priority terminal ID list is a list of terminal IDs of the terminal stations 3c that transmit terminal uplink signals having reception waveform information to be sorted into the priority queue 231. Here, the terminal IDs are identification information for identifying each terminal station 3c.

The annunciation signal transmission unit 225c transmits an annunciation signal to the terminal station 3c. The annunciation signal is a control signal for announcing that transmission of terminal transmission data to its own mobile relay station 2c is permitted. The annunciation signal transmission unit 225c wirelessly transmits, from the antenna 21, a terminal downlink signal in which an annunciation signal is set.

At this time, the annunciation signal transmission unit 225c transmits an annunciation signal to the terminal station 3c, the annunciation signal including at least one of the terminal IDs included in the priority terminal ID list stored in the terminal ID list storage unit 226c.

The reception unit 221 receives, through the antenna 21, a terminal uplink signal transmitted from the terminal station 3c. The terminal uplink signal contains terminal transmission data. The reception unit 221 outputs the received terminal uplink signal to the determination unit 223c.

The determination unit 223c specifies the reception timing at which the reception unit 221 has received the terminal uplink signal. Here, the reception timing is, for example, the reception time or the elapsed time from when the annunciation signal transmission unit 225c transmits an annunciation signal to the terminal station 3c. For example, the determination unit 223c determines whether the elapsed time exceeds a predetermined time period or whether the reception time is earlier than a predetermined time. The determination unit 223c outputs, to the reception waveform recording unit 222c, information indicating a determination result and the terminal uplink signal.

The reception waveform recording unit 222c samples a reception waveform of the terminal uplink signal acquired from the determination unit 223c, and generates waveform data indicating a value obtained by the sampling. The reception waveform recording unit 222c writes, in the data storage unit 23, the reception time of the terminal uplink signal in the antenna 21 and reception waveform information in which the generated waveform data is set.

At this time, in a case where the acquired determination result indicates that the elapsed time described above does not exceed the predetermined time period, or in a case where the acquired determination result indicates that the reception time described above is earlier than the predetermined time, the reception waveform recording unit 222c writes the reception time and the reception waveform information described above in the priority queue 231 of the data storage unit 23. On the other hand, in a case where the acquired determination result indicates that the elapsed time described above exceeds the predetermined time period, or in a case where the acquired determination result indicates that the reception time described above is later than the predetermined time, the reception waveform recording unit 222c writes the reception time and the reception waveform information described above in a general queue 232 of the data storage unit 23.

Note that the configuration related to transmission of base station downlink signals from the mobile relay station 2c to the base station 4-1 and the base station 4-2 is similar to that of the first embodiment, and thus description thereof is omitted.

The terminal station 3c includes a data storage unit 31, a transmission unit 32, one or more antennas 33, a reception unit 34, a transmission control unit 35c, and a terminal ID storage unit 36.

The data storage unit 31 stores sensor data and the like. The sensor data is data generated by an IoT terminal having the terminal station 3c and transmitted from the terminal station 3c to the mobile relay station 2c. The sensor data is, for example, environmental data indicating temperature, humidity, tidal currents, or the like around the IoT terminal having the terminal station 3c.

The terminal ID storage unit 36 stores in advance a terminal ID of the terminal station 3c, which is identification information given in advance to the terminal station 3c.

The reception unit 34 receives an annunciation signal transmitted from the mobile relay station 2c. The reception unit 34 outputs the annunciation signal to the transmission control unit 35c.

The transmission control unit 35c acquires the annunciation signal from the reception unit 34. The transmission control unit 35c extracts at least one terminal ID included in the acquired annunciation signal. In addition, the transmission control unit 35c reads the terminal ID of the terminal station 3c recorded in advance in the terminal ID storage unit 36. The transmission control unit 35c collates the extracted terminal ID with the terminal ID of the terminal station 3c.

The transmission control unit 35c changes the timing of transmitting a terminal uplink signal to the mobile relay station 2c in accordance with a result of the collation. For example, in a case where the terminal ID of the terminal station 3c is included in the at least one terminal ID that has been extracted, the transmission control unit 35c controls the transmission unit 32 to immediately start transmission of a terminal uplink signal. On the other hand, in a case where the terminal ID of the terminal station 3c is not included in the at least one terminal ID that has been extracted, the transmission control unit 35c controls the transmission unit 32 to start transmission of a terminal uplink signal after a predetermined time period has elapsed.

The transmission unit 32 transmits a terminal uplink signal to the mobile relay station 2c under the control of the transmission control unit 35c. The transmission unit 32 reads sensor data from the data storage unit 31 as terminal transmission data. The transmission unit 32 wirelessly transmits, from the antenna 33, a terminal uplink signal in which the read terminal transmission data is set.

With such a configuration, the mobile relay station 2c according to the present embodiment can receive a terminal uplink signal from the terminal station 3c to which a terminal ID that is included in the annunciation signal has been given at an earlier reception timing than the terminal station 3c to which a terminal ID that is not included in the annunciation signal has been given, and can record the reception waveform information in the priority queue 231.

An operation of the wireless communication system 1c will be described.

Figure 11:
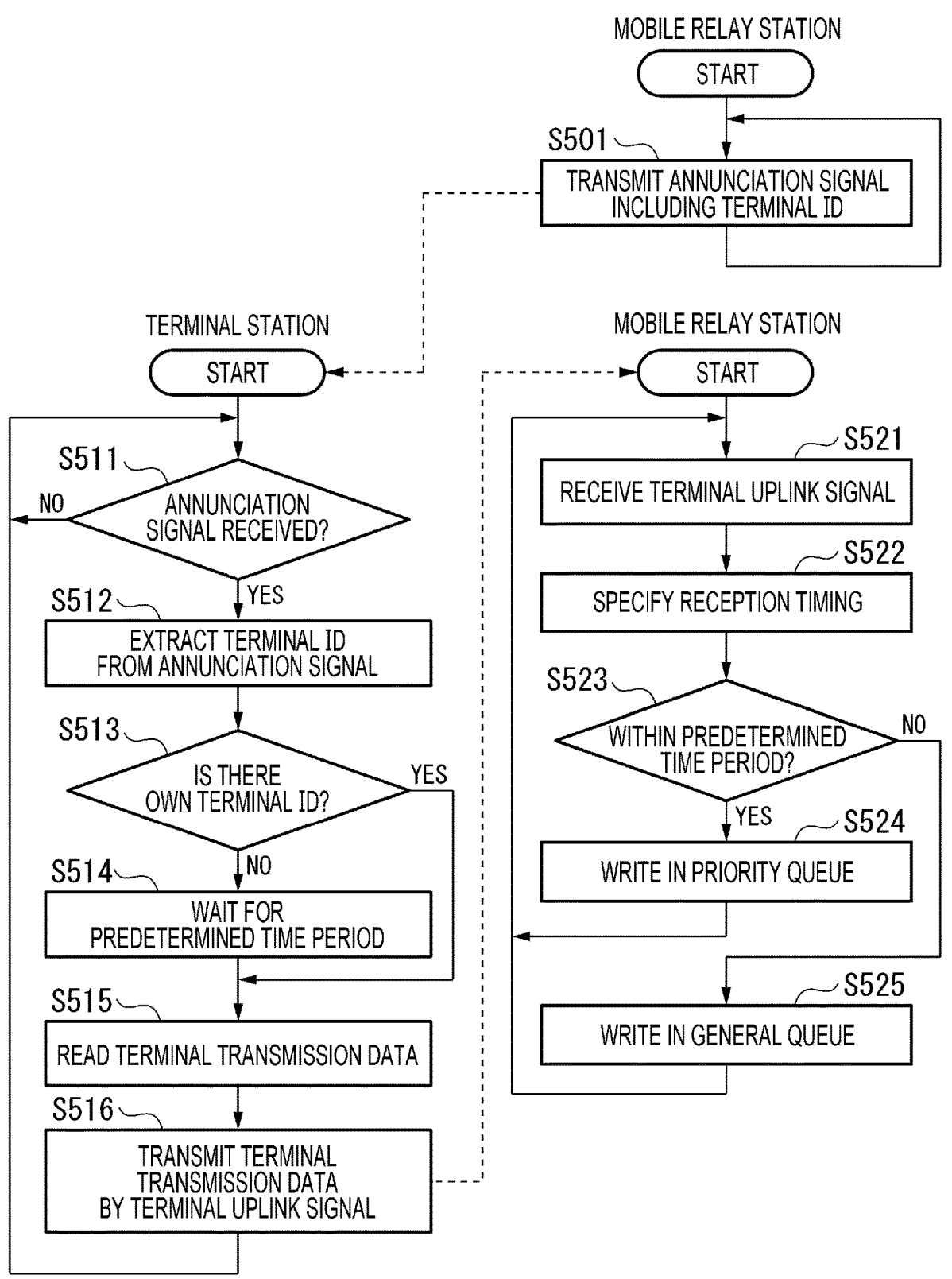
FIG. 11 is a flowchart illustrating processing of the wireless communication system according to the embodiment.

FIG. 11 is a flowchart illustrating processing of the wireless communication system 1c in a case where a terminal uplink signal is transmitted from the terminal station 3c. The processing illustrated in the flowchart is started when it is time for the mobile relay station 2c to transmit an annunciation signal to the terminal station 3c.

The annunciation signal transmission unit 225c transmits an annunciation signal to the terminal station 3c, the annunciation signal including at least one of the terminal IDs included in the priority terminal ID list stored in the terminal ID list storage unit 226c (step S501).

The reception unit 34 of the terminal station 3c waits for reception of an annunciation signal transmitted from the mobile relay station 2c (step S511). In a case where an annunciation signal has been received (step S511: YES), the reception unit 34 outputs the annunciation signal to the transmission control unit 35c. When acquiring the annunciation signal from the reception unit 34, the transmission control unit 35c extracts at least one terminal ID included in the acquired annunciation signal (step S512).

The transmission control unit 35c reads the terminal ID of the terminal station 3c recorded in advance in the terminal ID storage unit 36. The transmission control unit 35c collates the extracted terminal ID with the terminal ID of the terminal station 3c (step S513).

In a case where the terminal ID of the terminal station 3c is included in the at least one terminal ID that has been extracted (step S513: YES), the transmission control unit 35c controls the transmission unit 32 to read sensor data from the data storage unit 31 as terminal transmission data (step S515), and immediately starts transmission of a terminal uplink signal in which the terminal transmission data is set (step S516).

On the other hand, in a case where the terminal ID of the terminal station 3c is not included in the at least one terminal ID that has been extracted (step S513: NO), after waiting for a predetermined time period (step S514), the transmission control unit 35c controls the transmission unit 32 to read sensor data from the data storage unit 31 as terminal transmission data (step S515), and immediately starts transmission of a terminal uplink signal in which the terminal transmission data is set (step S516). The terminal station 3c repeats the processing from step S511.

The reception unit 221 of the mobile relay station 2c receives, through the antenna 21, a terminal uplink signal transmitted from the terminal station 3c (step S521). The reception unit 221 outputs the received terminal uplink signal to the determination unit 223c. The determination unit 223c specifies the reception timing at which the reception unit 221 has received the terminal uplink signal (step S522). Here, as an example, the reception timing is an elapsed time from when the annunciation signal transmission unit 225c transmits the annunciation signal to the terminal station 3c. The determination unit 223c outputs, to the reception waveform recording unit 222c, information indicating a determination result and the terminal uplink signal.

In a case where the acquired determination result indicates that the elapsed time described above does not exceed the predetermined time period (step S523: YES), the reception waveform recording unit 222c writes the reception time and the reception waveform information described above in the priority queue 231 of the data storage unit 23 (step S524). On the other hand, in a case where the acquired determination result indicates that the elapsed time described above exceeds the predetermined time period (step S523: NO), the reception waveform recording unit 222c writes the reception time and the reception waveform information described above in the general queue 232 of the data storage unit 23 (step S525). The mobile relay station 2c repeats the processing from step S521.

Note that the processing of the wireless communication system 1c in a case of transmitting a base station downlink signal from the mobile relay station 2c is similar to that of the first embodiment, and thus description thereof is omitted.

As described above, in the wireless communication system 1c according to the present embodiment, the mobile relay station 2c stores a priority terminal ID list. The priority terminal ID list is a list of terminal IDs given to the terminal stations 3c that transmit terminal transmission data (of a specific service) in which the reception waveform information is to be recorded in the priority queue 231. The mobile relay station 2c transmits, to at least one of the terminal stations 3c, an annunciation signal including a terminal ID included in the priority terminal ID list. The terminal station 3c extracts the terminal ID from the received annunciation signal, and collates the extracted terminal ID with the terminal ID of the terminal station 3c. The terminal station 3c changes the timing of transmitting a terminal uplink signal to the mobile relay station 2c in accordance with a result of the collation. The mobile relay station 2c sorts and records the reception waveform information into the priority queue 231 or the general queue 232 in accordance with the reception timing of the terminal uplink signal received from the terminal station 3c.

With such a configuration, the wireless communication system 1c does not need to use a plurality of satellite channels, and does not require the communication devices on both of the transmission side and the reception side (terminal station 3c side and base station 4-1 or 4-2 side) to have a mechanism capable of simultaneously transmitting and receiving a plurality of carriers (carrier waves). In addition, with such a configuration, for example, the wireless communication system 1c can transmit transmission data while prioritizing a specific service in which more quick transfer (with less transfer delay) of terminal transmission data to a base station device is desired. Thus, the wireless communication system 1c according to the present embodiment can reduce delays in data transfer while preventing complication of the device.

The present embodiment provides a configuration in which the mobile relay station 2c transmits, to the terminal station 3c, an annunciation signal including a terminal ID included in a priority terminal ID list, but the configuration is not limited thereto. For example, the mobile relay station 2c may transmit, to the terminal station 3c, an annunciation signal including information indicating a specific service. In this case, each terminal station 3c stores in advance, for example, information indicating a service provided by the terminal station 3c. The terminal station 3c may collate information indicating a service provided by the terminal station 3c with information indicating a specific service included in an annunciation signal, and change the timing of transmitting a terminal uplink signal to the mobile relay station 2c in accordance with a result of the collation.

Fifth Embodiment

In the wireless communication system 1c according to the fourth embodiment described above, the mobile relay station 2c transmits an annunciation signal to the terminal station 3c, the annunciation signal including at least one terminal ID included in the priority terminal ID list. The terminal station 3c that has received the annunciation signal collates the terminal ID included in the annunciation signal with the terminal ID given in advance to the terminal station 3c, and transmits, to the mobile relay station 2c, a terminal uplink signal in which terminal transmission data is set, at a transmission timing in accordance with a result of the collation.

On the other hand, in a wireless communication system 1d according to a fifth embodiment, there are a case where a mobile relay station 2d transmits an annunciation signal to a terminal station 3c, the annunciation signal including at least one terminal ID included in a priority terminal ID list, and a case where the mobile relay station 2d transmits an annunciation signal to the terminal station 3c, the annunciation signal not including any terminal ID. As described above, the priority terminal ID list is a list of terminal IDs of terminal stations 3d that transmit terminal uplink signals having reception waveform information to be sorted into a priority queue 231. Here, the terminal IDs are identification information for identifying each terminal station 3.

The mobile relay station 2d transmits an annunciation signal to the terminal station 3d, the annunciation signal including at least one terminal ID included in the priority terminal ID list. Next, after waiting for a predetermined time period, the mobile relay station 2d transmits an annunciation signal not including the terminal ID to the terminal station 3d. In a case where the terminal ID is included in the annunciation signal, the terminal station 3d that has received the annunciation signal collates the terminal ID included in the annunciation signal with the terminal ID given in advance to the terminal station 3d. In a case where the terminal ID of the terminal station 3d is included in the terminal ID included in the annunciation signal, the terminal station 3d transmits, to the mobile relay station 2d, a terminal uplink signal in which terminal transmission data is set.

On the other hand, in a case where the terminal ID is not included in the annunciation signal, the terminal station 3d that has received the annunciation signal transmits, to the mobile relay station 2d, a terminal uplink signal in which terminal transmission data is set.

With such a configuration, in the wireless communication system 1d according to the fifth embodiment, the mobile relay station 2d can first receive only terminal uplink signals from the terminal station 3d to which a terminal ID included in the priority terminal ID list has been given, and can later receive terminal uplink signals from all the terminal stations 3d.

Hereinafter, details of the configuration of the wireless communication system 1d according to the fifth embodiment will be described, focusing on differences from the fourth embodiment.

Figure 12:
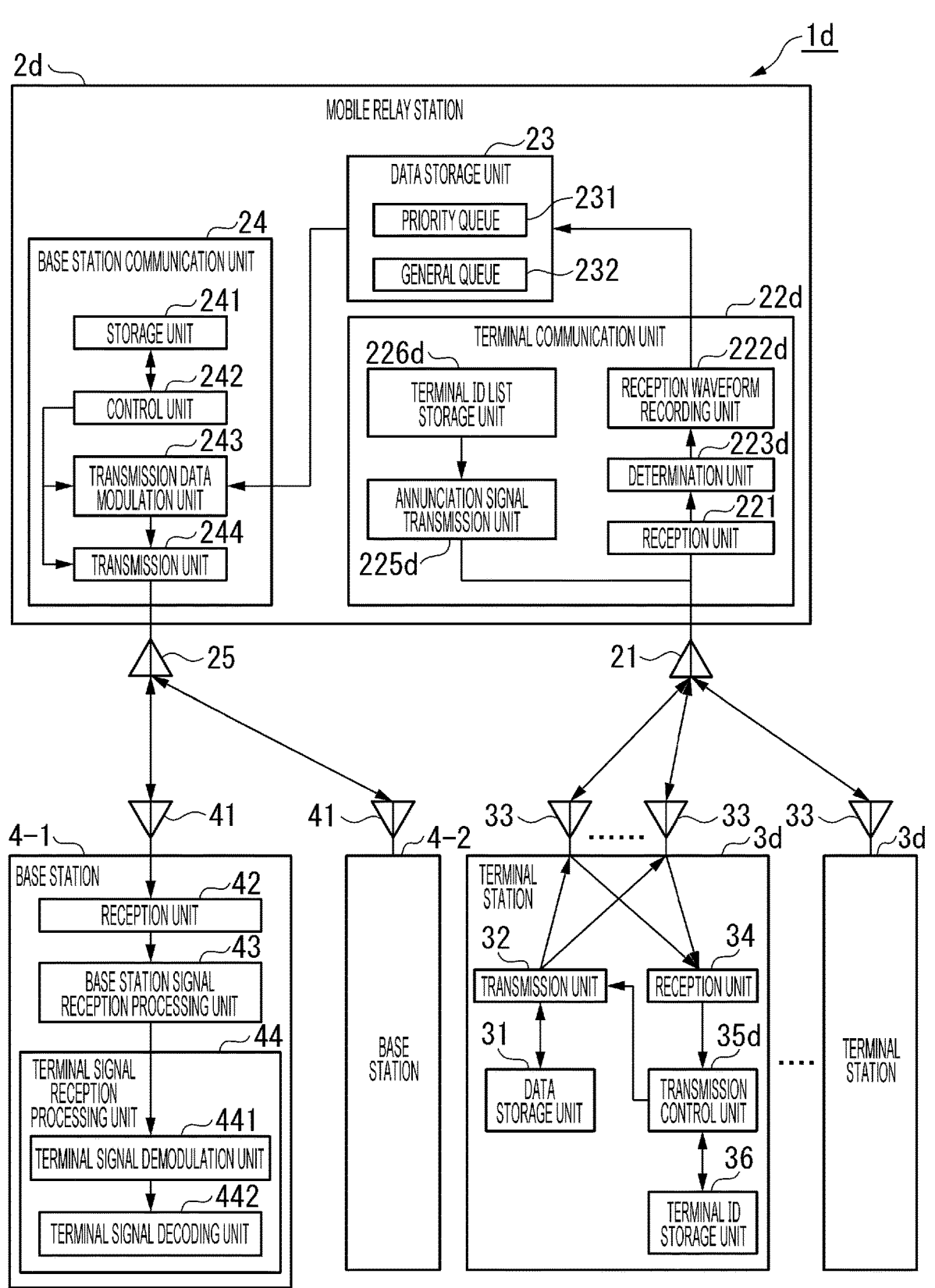
FIG. 12 is a configuration diagram of a wireless communication system according to a fifth embodiment of the present invention.

FIG. 12 is a configuration diagram of the wireless communication system 1d according to the fifth embodiment. The wireless communication system 1d includes the mobile relay station 2d, the terminal stations 3d, a base station 4-1, and a base station 4-2. Information transmitted from each one of a plurality of the terminal stations 3d is transmitted via the mobile relay station 2d and collected by the base station 4-1 or the base station 4-2.

A configuration of each device will be described.

The mobile relay station 2d includes an antenna 21, a terminal communication unit 22d, a data storage unit 23, a base station communication unit 24, and an antenna 25.

The terminal communication unit 22d includes a reception unit 221, a reception waveform recording unit 222d, a determination unit 223d, an annunciation signal transmission unit 225d, and a terminal ID list storage unit 226d.

The terminal ID list storage unit 226d (terminal identification information list storage) stores a priority terminal ID list in advance. As described above, the priority terminal ID list is a list of terminal IDs of the terminal stations 3d that transmit terminal uplink signals having reception waveform information to be sorted into the priority queue 231. Here, the terminal IDs are identification information for identifying each terminal station 3d.

The annunciation signal transmission unit 225d transmits an annunciation signal to the terminal station 3d. The annunciation signal is a control signal for announcing that transmission of terminal transmission data to its own mobile relay station 2d is permitted. The annunciation signal transmission unit 225d wirelessly transmits, from the antenna 21, a terminal downlink signal in which an annunciation signal is set.

At this time, the annunciation signal transmission unit 225d transmits an annunciation signal to the terminal station 3d, the annunciation signal including at least one of the terminal IDs included in the priority terminal ID list stored in the terminal ID list storage unit 226d. Next, after waiting for a predetermined time period, the mobile relay station 2d transmits an annunciation signal to the terminal station 3d, the annunciation signal not including the terminal ID.

The reception unit 221 receives, through the antenna 21, a terminal uplink signal transmitted from the terminal station 3c. The terminal uplink signal contains terminal transmission data. The reception unit 221 outputs the received terminal uplink signal to the determination unit 223d.

The determination unit 223d specifies the reception timing at which the reception unit 221 has received the terminal uplink signal. Here, the reception timing is, for example, the reception time or the elapsed time from when an annunciation signal transmission unit 225c transmits, to the terminal station 3d, an annunciation signal including a terminal ID included in the priority terminal ID list. For example, the determination unit 223d determines whether the elapsed time exceeds a predetermined time period or whether the reception time is earlier than a predetermined time. The determination unit 223d outputs, to the reception waveform recording unit 222d, information indicating a determination result and the terminal uplink signal.

The reception waveform recording unit 222d samples a reception waveform of the terminal uplink signal acquired from the determination unit 223d, and generates waveform data indicating a value obtained by the sampling. The reception waveform recording unit 222d writes, in the data storage unit 23, the reception time of the terminal uplink signal in the antenna 21 and reception waveform information in which the generated waveform data is set.

At this time, in a case where the acquired determination result indicates that the elapsed time described above does not exceed the predetermined time period, or in a case where the acquired determination result indicates that the reception time described above is earlier than the predetermined time, the reception waveform recording unit 222d writes the reception time and the reception waveform information described above in the priority queue 231 of the data storage unit 23. On the other hand, in a case where the acquired determination result indicates that the elapsed time described above exceeds the predetermined time period, or in a case where the acquired determination result indicates that the reception time described above is later than the predetermined time, the reception waveform recording unit 222c writes the reception time and the reception waveform information described above in a general queue 232 of the data storage unit 23.

Note that the configuration related to transmission of base station downlink signals from the mobile relay station 2d to the base station 4-1 and the base station 4-2 is similar to that of the first embodiment, and thus description thereof is omitted.

The terminal station 3d includes a data storage unit 31, a transmission unit 32, one or more antennas 33, a reception unit 34, a transmission control unit 35d, and a terminal ID storage unit 36.

The data storage unit 31 stores sensor data and the like. The sensor data is data generated by an IoT terminal having the terminal station 3d and transmitted from the terminal station 3d to the mobile relay station 2d. The sensor data is, for example, environmental data indicating temperature, humidity, tidal currents, or the like around the IoT terminal having the terminal station 3d.

The terminal ID storage unit 36 stores in advance a terminal ID of the terminal station 3d, which is identification information given in advance to the terminal station 3d.

The reception unit 34 receives an annunciation signal transmitted from the mobile relay station 2*d*. The reception unit 34 outputs the annunciation signal to the transmission control unit 35*d*.

The transmission control unit 35*d* acquires the annunciation signal from the reception unit 34. In a case where at least one terminal ID is included in the acquired annunciation signal, the transmission control unit 35*d* extracts the terminal ID. In addition, the transmission control unit 35*d* reads the terminal ID of the terminal station 3*d* recorded in advance in the terminal ID storage unit 36. The transmission control unit 35*d* collates the extracted terminal ID with the terminal ID of the terminal station 3*d*.

The transmission control unit 35*d* determines whether to transmit a terminal uplink signal to the mobile relay station 2*d* in accordance with a result of the collation. For example, in a case where the terminal ID of the terminal station 3*d* is included in the at least one terminal ID that has been extracted, the transmission control unit 35*d* controls the transmission unit 32 to start transmission of a terminal uplink signal. On the other hand, in a case where the terminal ID of the terminal station 3*d* is not included in the at least one terminal ID that has been extracted, the transmission control unit 35*d* does not transmit a terminal uplink signal.

On the other hand, in a case where the terminal ID is not included in the acquired annunciation signal, the transmission control unit 35*d* controls the transmission unit 32 to start transmission of a terminal uplink signal.

The transmission unit 32 transmits a terminal uplink signal to the mobile relay station 2*d* under the control of the transmission control unit 35*d*. The transmission unit 32 reads sensor data from the data storage unit 31 as terminal transmission data. The transmission unit 32 wirelessly transmits, from the antenna 33, a terminal uplink signal in which the read terminal transmission data is set.

With such a configuration, the mobile relay station 2*d* according to the present embodiment can receive a terminal uplink signal from the terminal station 3*d* to which a terminal ID that is included in the annunciation signal has been given at an earlier reception timing than the terminal station 3*d* to which a terminal ID that is not included in the annunciation signal has been given, and can record the reception waveform information in the priority queue 231.

An operation of the wireless communication system 1*d* will be described.

Figure 13:
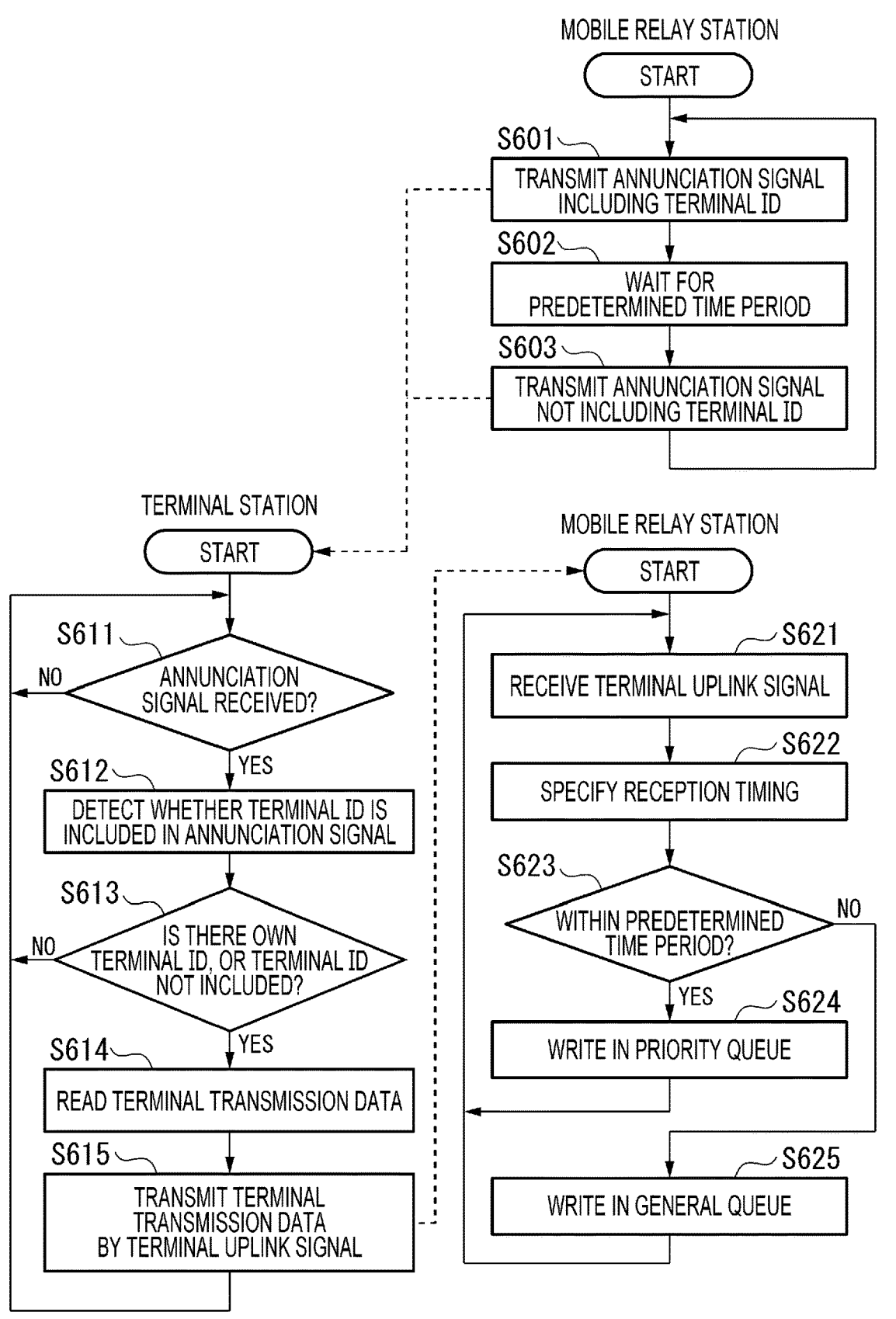
FIG. 13 is a flowchart illustrating processing of the wireless communication system according to the embodiment.

FIG. 13 is a flowchart illustrating processing of the wireless communication system 1*d* in a case where a terminal uplink signal is transmitted from the terminal station 3*d*. The processing illustrated in the flowchart is started when it is time for the mobile relay station 2*d* to transmit an annunciation signal to the terminal station 3*d*.

The annunciation signal transmission unit 225*d* transmits an annunciation signal to the terminal station 3*d*, the annunciation signal including at least one of the terminal IDs included in the priority terminal ID list stored in the terminal ID list storage unit 226*d* (step S601). After waiting for a predetermined time period (step S602), the annunciation signal transmission unit 225*d* transmits an annunciation signal to the terminal station 3*d*, the annunciation signal not including the terminal ID (step S603).

The reception unit 34 of the terminal station 3*d* waits for reception of an annunciation signal transmitted from the mobile relay station 2*d* (step S611). In a case where an annunciation signal has been received (step S611: YES), the reception unit 34 outputs the annunciation signal to the transmission control unit 35*d*. When acquiring the annunciation signal from the reception unit 34, the transmission control unit 35*d* detects whether the terminal ID is included in the acquired annunciation signal (step S612).

In a case where at least one terminal ID is included in the acquired annunciation signal, the transmission control unit 35*d* reads the terminal ID of the terminal station 3*d* recorded in advance in the terminal ID storage unit 36. The transmission control unit 35*d* collates the extracted terminal ID with the terminal ID of the terminal station 3*d*.

In a case where the terminal ID of the terminal station 3*d* is included in the at least one terminal ID that has been extracted, or in a case where the terminal ID is not included in the acquired annunciation signal (step S613: YES), the transmission control unit 35*d* controls the transmission unit 32 to read sensor data from the data storage unit 31 as terminal transmission data (step S614), and starts transmission of a terminal uplink signal in which the terminal transmission data is set (step S615). On the other hand, in a case where the terminal ID is included in the acquired annunciation signal and the terminal ID of the terminal station 3*d* is not included in the at least one terminal ID that has been extracted (step S613: NO), the transmission control unit 35*d* does not transmit a terminal uplink signal. The terminal station 3*d* repeats the processing from step S611.

The reception unit 221 of the mobile relay station 2*d* receives, through the antenna 21, a terminal uplink signal transmitted from the terminal station 3*d* (step S621). The reception unit 221 outputs the received terminal uplink signal to the determination unit 223*d*. The determination unit 223*d* specifies the reception timing at which the reception unit 221 has received the terminal uplink signal (step S622). Here, as an example, the reception timing is an elapsed time from when the annunciation signal transmission unit 225*d* transmits, to the terminal station 3*d*, the annunciation signal including a terminal ID included in the priority terminal ID list. The determination unit 223*d* outputs, to the reception waveform recording unit 222*d*, information indicating a determination result and the terminal uplink signal.

In a case where the acquired determination result indicates that the elapsed time described above does not exceed the predetermined time period (step S623: YES), the reception waveform recording unit 222*d* writes the reception time and the reception waveform information described above in the priority queue 231 of the data storage unit 23 (step S624). On the other hand, in a case where the acquired determination result indicates that the elapsed time described above exceeds the predetermined time period (step S623: NO), the reception waveform recording unit 222*d* writes the reception time and the reception waveform information described above in the general queue 232 of the data storage unit 23 (step S625). The mobile relay station 2*d* repeats the processing from step S621.

Note that the processing of the wireless communication system 1*d* in a case of transmitting a base station downlink signal from the mobile relay station 2*d* is similar to that of the first embodiment, and thus description thereof is omitted.

As described above, in the wireless communication system 1*d* according to the present embodiment, the mobile relay station 2*d* stores a priority terminal ID list. The priority terminal ID list is a list of terminal IDs given to the terminal stations 3*c* that transmit terminal transmission data (of a specific service) in which the reception waveform information is to be recorded in the priority queue 231.

The mobile relay station 2*d* transmits, to at least one of the terminal stations 3*d*, an annunciation signal including a terminal ID included in the priority terminal ID list. Next, after waiting for a predetermined time period, the mobile relay station 2d transmits the annunciation signal to at least one of the terminal stations 3d, the annunciation signal not including the terminal ID. The terminal station 3d detects whether the terminal ID is included in the received annunciation signal. In a case where the terminal ID is included in the received annunciation signal, the terminal station 3d collates the extracted terminal ID with the terminal ID of the terminal station 3d. The terminal station 3d determines whether to transmit a terminal uplink signal to the mobile relay station 2d in accordance with the detection result and the collation result described above. For example, in a case where the extracted terminal ID includes the terminal ID of the terminal station 3d, or in a case where the received annunciation signal does not include the terminal ID, the terminal station 3d transmits a terminal uplink signal to the mobile relay station 2d. The mobile relay station 2d sorts and records the reception waveform information into the priority queue 231 or the general queue 232 in accordance with the reception timing of the terminal uplink signal received from the terminal station 3d.

With such a configuration, the wireless communication system 1d does not need to use a plurality of satellite channels, and does not require the communication devices on both of the transmission side and the reception side (terminal station 3d side and base station 4-1 or 4-2 side) to have a mechanism capable of simultaneously transmitting and receiving a plurality of carriers (carrier waves). In addition, with such a configuration, for example, the wireless communication system 1d can transmit transmission data while prioritizing a specific service in which more quick transfer (with less transfer delay) of terminal transmission data to a base station device is desired. Thus, the wireless communication system 1d according to the present embodiment can reduce delays in data transfer while preventing complication of the device.

The present embodiment provides a configuration in which the mobile relay station 2d transmits, to the terminal station 3d, an annunciation signal including a terminal ID included in a priority terminal ID list, and then transmits an annunciation signal to the terminal station 3d, the annunciation signal not including the terminal ID, but the configuration is not limited thereto. For example, after the mobile relay station 2d transmits, to the terminal station 3d, an annunciation signal including information indicating a specific service, the mobile relay station 2d may transmit an annunciation signal to the terminal station 3d, the annunciation signal not including the information indicating the service. In this case, each terminal station 3d stores in advance, for example, information indicating a service provided by the terminal station 3d. The terminal station 3d detects whether the received annunciation signal includes information indicating a specific service. In a case where the received annunciation signal includes information indicating a specific service, the terminal station 3d collates the information indicating the service provided by the terminal station 3d with the information indicating the specific service included in the annunciation signal. The terminal station 3d may transmit a terminal uplink signal to the mobile relay station 2c in accordance with the detection result and the collation result described above.

According to the embodiments described above, without demodulating a radio terminal uplink signal received from the terminal station, the mobile relay station stores and accumulates information of the reception signal waveform, and performs wireless transmission at a timing at which communication with the base station is possible. The base station performs reception processing such as demodulation and decoding on the terminal uplink signal indicated by the reception signal waveform in the mobile relay station. Thus, a non-regenerative relay system that does not depend on the communication scheme can be applied to a wireless communication system using a low earth orbit satellite. In addition, since non-regenerative relay is performed, the mobile relay station does not need to implement a wireless communication scheme used for the terminal station. For example, in a case where a terminal station that performs communication by using a new wireless communication scheme has been added, it is not necessary to make a change to the mobile relay station, and the only change to be made is to add the wireless communication scheme to the base station installed on the ground. It is therefore possible to simultaneously contain various IoT systems, and it is also possible to easily deal with an update of the IoT systems. In addition, since processing for a large Doppler shift applied to each terminal station can be performed by the base station instead of the mobile relay station, it is not necessary to implement, in the mobile relay station, a complicated nonlinear operation for compensating for the Doppler shift.

Each embodiment described above provides a configuration in which the mobile relay station does not demodulate a radio terminal uplink signal received from the terminal station, but the configuration is not limited thereto. For example, the mobile relay station may demodulate and decode a terminal uplink signal, and transmit data obtained by the decoding to the base station.

The above embodiments describe a case where the mobile object on which the mobile relay station is mounted is an LEO satellite, but the mobile object may be any other flying object that flies overhead, such as a geostationary orbit satellite, a drone, or a HAPS.

In the above embodiments, a configuration for transmitting specific terminal transmission data earlier in time has been described as an example of a configuration for preferentially transmitting specific terminal transmission data. For example, in a case where annunciation signals have been transmitted from the mobile relay station to a plurality of terminal stations scattered at different positions, there may be a terminal station having a positional relationship in which the elevation angle of the mobile relay station is small and a communication available time period is about to end. In such a case, it is required to transmit specific terminal transmission data earlier, and the above configuration is effective.

However, the configuration is not limited to such a configuration. For example, as a configuration for preferentially transmitting specific terminal transmission data, the specific terminal transmission data may be transmitted at a timing at which the distance between the mobile relay station and the terminal station is relatively shorter. Alternatively, for example, as a configuration for preferentially transmitting specific terminal transmission data, the specific terminal transmission data may be transmitted at a timing at which the elevation angle of the mobile relay station at the position of the terminal station is larger. In general, the communication quality is often good at a timing at which the distance between the mobile relay station and the terminal station is relatively shorter and at a timing at which the elevation angle of the mobile relay station at the position of the terminal station is larger. With such a configuration, the mobile relay station can transmit specific terminal transmission data at a timing at which the communication quality is better.

Note that preamble patterns may be given in any unit. For example, a preamble pattern may be uniquely given to each one of a plurality of services provided by the wireless communication system. Alternatively, for example, a preamble pattern may be uniquely given to each terminal station or each model of terminal stations. Alternatively, for example, a preamble pattern may be uniquely given to each user of the service provided by the wireless communication system, each provider, or each user of the terminal station.

Note that the specific service list stored in the mobile relay station may be able to be updated by, for example, transmitting data of the specific service list for update from the base station. In this case, when a service provided by the wireless communication system is newly added or a new terminal station is installed, it is possible to easily set or change a service level only by updating the specific service list. The change of the service level is, for example, a change from a priority service to a general service or a change from a general service to a priority service.

The above embodiments provide, as an example, a configuration in which the data storage unit 23 includes two queues, that is, the priority queue 231 and the general queue 232. That is, in the above embodiments, as an example, there are two priority levels (priority or general). However, the configuration is not limited to such a configuration, and three or more priority levels may be able to be set. The above embodiments provide, as an example, a configuration in which the wireless communication system includes two types of base station devices, that is, a base station device for a specific service and a base station device for general services. However, the configuration is not limited to such a configuration, and, for example, the wireless communication system may include three or more types of base station devices in accordance with the number of the priority levels described above.

It is basically desirable that the priority queue 231 and the general queue 232 have a sufficient storage capacity. For example, in a case where a large amount of data is recorded in the priority queue 231 and the general queue 232 and not all the data has been successfully transmitted to the base station during the communication available time period, it is only required to wait for the next orbit of the mobile relay station and resume the transmission of the data to the base station.

In a case where data is still accumulated to the upper limit of the storage capacity of the priority queue 231, for example, the mobile relay station may record excess data, which should have been recorded in the priority queue 231, in the general queue 232 instead. The mobile relay station may transfer, to the priority queue 231, the data recorded in the general queue 232 instead when, for example, a free space is generated in the priority queue 231.

According to the embodiments described above, the wireless communication system includes a plurality of terminal devices, a relay device mounted on a mobile object, and at least one base station device. For example, the terminal devices are the terminal stations 3, 3c, and 3d in the embodiments, the mobile object is a low earth orbit satellite in the embodiments, the relay device is the mobile relay stations 2, 2a, 2b, 2c, and 2d in the embodiments, and the base station device is the base stations 4-1, 4a-1, 4b-1, 4-2, 4a-2, and 4b-2 in the embodiments.

The terminal device includes a terminal device transmission unit (a terminal device transmitter). For example, the terminal device transmission unit is the transmission unit 32, the antenna 33, and the transmission control units 35, 35c, and 35d in the embodiments. The terminal device transmission unit transmits a signal including transmission data to the relay device. For example, the transmission data is terminal transmission data in the embodiments, and the signal is a terminal uplink signal in the embodiments.

The relay device (wireless communication device (apparatus)) includes a relay device reception unit, a plurality of queues, a sorting unit (a sorter), and a relay device transmission unit (a relay device transmitter). For example, the relay device reception unit (a relay device reception unit) is the antennas 21 and 21-1 to 21-N and the reception units 221 and 221b-1 to 221b-N in the embodiments, the plurality of queues is the priority queue 231 and the general queue 232 in the embodiments, the sorting unit is the determination units 223, 223c, and 223d in the embodiments, and the relay device transmission unit is the base station communication units 24 and 26 and the antenna 25 in the embodiments.

The relay device reception unit receives a signal transmitted from the terminal device. The plurality of queues stores transmission data included in the signal. The sorting unit sorts and records the transmission data included in the signal into any one of the plurality of queues on the basis of a preamble pattern included in the signal or a reception timing of the signal. At a timing at which communication with the base station device is possible, the relay device transmission unit transmits signals indicating transmission data recorded in the plurality of queues to the base station device, while prioritizing transmission data recorded in a predetermined queue among the plurality of queues. For example, the signals are the base station downlink signals in the embodiments.

Note that the terminal device transmission unit may transmit, to the relay device, the signal indicating data in which a predetermined preamble pattern has been given to the transmission data. In this case, the relay device may further include a relay device storage unit (a relay device storage). The relay device storage unit stores a list of preamble patterns. In this case, the sorting unit may collate the preamble pattern included in the signal with the preamble patterns included in the list, and sort and record the transmission data into any one of the plurality of queues in accordance with a result of the collation. For example, the relay device storage unit is the specific service list storage unit 224 in the embodiments, and the list of preamble patterns is the specific service list L in the embodiments.

Note that the terminal device may further include a terminal device reception unit (a terminal device receiver) and a transmission control unit. The terminal device reception unit receives a terminal identification information list that has been transmitted from the relay device and includes at least one piece of identification information for identifying the plurality of terminal devices. The transmission control unit controls the terminal device transmission unit in such a way that the signals are transmitted to the relay device at various timings in accordance with whether the identification information of the terminal device is included in the terminal identification information list. In this case, the sorting unit sorts and records the transmission data into any one of the plurality of queues on the basis of the reception timing. For example, the terminal device reception unit is the reception unit 34 in the embodiments, the identification information is a terminal ID in the embodiments, the terminal identification information list is a list of at least one terminal ID included in the priority terminal ID list in the embodiments, and the transmission control unit is the transmission control units 35c and 35d in the embodiments.

Note that the terminal device may further include a terminal device reception unit and a transmission control unit. The terminal device reception unit receives an annunciation signal transmitted from the relay device. The transmission control unit transmits the signal to the relay device in a case where the annunciation signal includes a terminal identification information list including at least one piece of identification information for identifying the plurality of terminal devices and the terminal identification information list includes the identification information of the terminal device, or in a case where the annunciation signal does not include the terminal identification information list. In this case, the relay device may further include a relay device transmission unit. The relay device transmission unit transmits, to the terminal device at different timings, an annunciation signal that includes the terminal identification information list and an annunciation signal that does not include the terminal identification information list. In this case, the sorting unit may sort and record the transmission data into any one of the plurality of queues on the basis of the reception timing. For example, the terminal identification information list is a list of at least one terminal ID included in the priority terminal ID list in the embodiments.

The wireless communication system may include a first base station device and a second base station device. For example, the first base station device is the base stations 4-1, 4a-1, and 4b-1 in the embodiments, and the second base station device is the base stations 4-2, 4a-2, and 4b-2 in the embodiments. The relay device transmission unit may transmit the transmission data recorded in a predetermined queue to the first base station device at a timing at which communication with the first base station device is possible. For example, the predetermined queue is the priority queue 231 in the embodiments. The relay device transmission unit may transmit the transmission data recorded in the plurality of queues to the second base station device at a timing at which communication with the second base station device is possible, while prioritizing the transmission data recorded in the predetermined queue.

The wireless communication system may include a plurality of the first base station devices.

The relay device transmission unit may transmit the transmission data recorded in the predetermined queue first, and then transmit the transmission data recorded in a queue different from the predetermined queue later. For example, the queue different from the predetermined queue is the general queue 232 in the embodiments.

The relay device transmission unit may transmit the transmission data recorded in the predetermined queue at a timing at which the distance between the relay device and the second base station device is relatively short, and transmit the transmission data recorded in a queue different from the predetermined queue at a timing at which the distance is relatively long.

The relay device may be mounted on a mobile object that is a flying object. The relay device transmission unit may transmit the transmission data recorded in the predetermined queue at a timing at which the elevation angle of the relay device at the position of the second base station device is relatively large, and transmit the transmission data recorded in a queue different from the predetermined queue at a timing at which the elevation angle is relatively small.

The relay device may be mounted on a low earth orbit satellite, and the terminal device and the base station device may be installed on the Earth.

While the embodiments of the present invention have been described in detail with reference to the drawings, specific configurations are not limited to these embodiments, and include designs and the like without departing from the spirit of the present invention.

The mobile relay stations 2, 2a, 2b, 2c, and 2d, the terminal stations 33c and 3d, and the base stations 4-1, 4-2, 4a-1, 4a-2, 4b-1, and 4b-2 in the embodiments described above may be implemented by a computer. In that case, a program for implementing these functions may be recorded in a computer-readable recording medium, and the program recorded in the recording medium may be read and executed by a computer system to implement the functions. Note that the "computer system" here includes hardware such as an OS and peripheral devices. Also, the "computer-readable recording medium" refers to a portable medium such as a flexible disk, a magneto-optical disk, a ROM, or a CD-ROM, or a storage device such as a hard disk built in the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. In addition, the above program may be for implementing some of the functions described above, may be one that can implement the functions described above in combination with a program already recorded in the computer system, or may be one implemented by using a programmable logic device such as a field programmable gate array (FPGA).

REFERENCE SIGNS LIST

1, 1a, 1b, 1c, 1d Wireless communication system
2, 2a, 2b, 2c, 2d Mobile relay station
3, 3c, 3d Terminal station
4-1, 4a-1, 4b-1, 4-2, 4a-2, 4b-2 Base station
21, 21-1 to 21-N Antenna
22, 22b, 22c, 22d Terminal communication unit
23 Data storage unit
24, 26 Base station communication unit
25 Antenna
31 Data storage unit
32 Transmission unit
33 Antenna
34 Reception unit
35, 35c, 35d Transmission control unit
36 Terminal ID storage unit
41 Antenna
42 Reception unit
43, 430 Base station signal reception processing unit
44 Terminal signal reception processing unit
221, 221b-1 to 221b-N Reception unit
222, 222b-1 to 222b-N, 222c, 222d Reception waveform recording unit
223, 223b-1 to 223b-N, 223c, 223d Determination unit
224, 224b Specific service list storage unit
225, 225b, 225c, 225d Annunciation signal transmission unit
226c, 226d Terminal ID list storage unit
231 Priority queue
232 General queue
241, 261 Storage unit
242, 262 Control unit
243, 263 Transmission data modulation unit
244 Transmission unit
264 MIMO transmission unit
311 Sensor data
312 Orbit information
313 Self-position information

39

314 Output control information
351 Timing control unit
352 Distance calculation unit
353 Output control unit
410 Antenna station
420 MIMO reception unit
430 Base station signal reception processing unit
441 Terminal signal demodulation unit
442 Terminal signal decoding unit
450 Terminal signal reception processing unit
451 Distribution unit
452-1 to 452-N Terminal signal demodulation unit
453 Combination unit
454 Terminal signal decoding unit

The invention claimed is:

1. A wireless communication system including a plurality of terminal devices, a relay device mounted on a mobile object, and at least one base station device,
wherein the terminal device includes:
a terminal device transmitter that transmits a signal including transmission data to the relay device, and
the relay device includes:
a relay device receiver that receives the signal transmitted from the terminal device;
a plurality of queues that stores the transmission data included in the signal;
a sorter that sorts and records the transmission data included in the signal into any one of the plurality of queues on the basis of a preamble pattern included in the signal or a reception timing of the signal; and
a relay device transmitter that transmits signals indicating the transmission data recorded in the plurality of queues to the base station device at a timing at which communication with the base station device is possible, while prioritizing transmission data recorded in a predetermined queue among the plurality of queues.

2. The wireless communication system according to claim 1, wherein
the terminal device transmitter is configured to:
transmit, to the relay device, the signal indicating data in which a predetermined one of the preamble patterns has been given to the transmission data,
the relay device further includes:
a relay device storage that stores a list of the preamble patterns, and
the sorter collates the preamble pattern included in the signal with the preamble patterns included in the list, and sorts and records the transmission data into any one of the plurality of queues in accordance with a result of the collation.

3. The wireless communication system according to claim 1, wherein
the terminal device further includes:
a terminal device receiver that receives a terminal identification information list that has been transmitted from the relay device and includes at least one piece of identification information for identifying the plurality of terminal devices; and
a transmission controller that controls the terminal device transmitter in such a way that the signals are transmitted to the relay device at various timings in accordance with whether the identification information of the terminal device is included in the terminal identification information list, and
the sorter sorts and records the transmission data into any one of the plurality of queues on the basis of the reception timing.

4. The wireless communication system according to claim 1, wherein
the terminal device further includes:
a terminal device receiver that receives an annunciation signal transmitted from the relay device; and
a transmission controller that transmits the signal to the relay device in a case where the annunciation signal includes a terminal identification information list including at least one piece of identification information for identifying the plurality of terminal devices and the terminal identification information list includes the identification information of the terminal device, or in a case where the annunciation signal does not include the terminal identification information list,
the relay device further includes:
a relay device transmitter that transmits, to the terminal device at different timings, an annunciation signal that includes the terminal identification information list and an annunciation signal that does not include the terminal identification information list, and
the sorter sorts and records the transmission data into any one of the plurality of queues on the basis of the reception timing.

5. The wireless communication system according to claim 1, wherein:
a first base station device and
a second base station device are included, and
the relay device transmitter is configured to:
transmit the transmission data recorded in the predetermined queue to the first base station device at a timing at which communication with the first base station device is possible; and
transmit the transmission data recorded in the plurality of queues to the second base station device at a timing at which communication with the second base station device is possible, while prioritizing the transmission data recorded in the predetermined queue.

6. The wireless communication system according to claim 5, wherein
a plurality of the first base station devices is included.

7. The wireless communication system according to claim 5, wherein
the relay device transmitter transmits the transmission data recorded in the predetermined queue at a timing at which a distance between the relay device and the second base station device is relatively short, and transmits the transmission data recorded in a queue different from the predetermined queue at a timing at which the distance is relatively long.

8. The wireless communication system according to claim 5, wherein
the relay device is mounted on the mobile object that is a flying object, and
the relay device transmitter transmits the transmission data recorded in the predetermined queue at a timing at which an elevation angle of the relay device at a position of the second base station device is relatively large, and transmits the transmission data recorded in a queue different from the predetermined queue at a timing at which the elevation angle is relatively small.

9. The wireless communication system according to claim 1, wherein
the relay device transmitter transmits the transmission data recorded in the predetermined queue first, and then transmits the transmission data recorded in a queue different from the predetermined queue later.

10. The wireless communication system according to claim 1, wherein the relay device is mounted on a low earth orbit satellite, and the terminal device and the base station device are installed on the Earth.

11. A wireless communication device mounted on a mobile object, the wireless communication device comprising:

a receiver that receives a signal including transmission data transmitted from a terminal device;

a plurality of queues that stores the transmission data included in the signal;

a sorter that sorts and records the transmission data included in the signal into any one of the plurality of queues on the basis of a preamble pattern included in the signal or a reception timing of the signal; and a transmitter that transmits signals indicating the transmission data recorded in the plurality of queues to a base station device at a timing at which communication with the base station device is possible, while prioritizing transmission data recorded in a predetermined queue among the plurality of queues.

12. The wireless communication device according to claim 11, further comprising:

a relay device storage that stores a list of preamble patterns, in which the sorter collates the preamble pattern included in the signal with the preamble patterns included in the list, and sorts and records the transmission data into any one of the plurality of queues in accordance with a result of the collation.

13. The wireless communication device according to claim 11, further comprising:

a terminal identification information list storage that stores a terminal identification information list including at least one piece of identification information for identifying the plurality of terminal devices, in which a relay device transmitter transmits, to the terminal device at different timings, an annunciation signal that includes the terminal identification information list and an annunciation signal that does not include the terminal identification information list, and the sorter sorts and records the transmission data into any one of the plurality of queues on the basis of the reception timing.

14. The wireless communication device according to claim 11, wherein the transmitter is configured to:

transmit the transmission data recorded in the predetermined queue to a first base station device at a timing at which communication with the first base station device is possible; and transmit the transmission data recorded in the plurality of queues to a second base station device different from the first base station device at a timing at which communication with the second base station device is possible, while prioritizing the transmission data recorded in the predetermined queue.

15. The wireless communication device according to claim 14, wherein the transmitter transmits the transmission data recorded in the predetermined queue at a timing at which a distance between the device and the second base station device is relatively short, and transmits the transmission data recorded in a queue different from the predetermined queue at a timing at which the distance is relatively long.

16. The wireless communication device according to claim 14, wherein the wireless communication device is mounted on the mobile object that is a flying object, and the transmitter transmits the transmission data recorded in the predetermined queue at a timing at which an elevation angle of the device at a position of the second base station device is relatively large, and transmits the transmission data recorded in a queue different from the predetermined queue at a timing at which the elevation angle is relatively small.

17. The wireless communication device according to claim 11, wherein the transmitter transmits the transmission data recorded in the predetermined queue first, and then transmits the transmission data recorded in a queue different from the predetermined queue later.

18. The wireless communication device according to claim 11, wherein the wireless communication device is mounted on a low earth orbit satellite, and the terminal device and the base station device are installed on the Earth.

19. A wireless communication method to be executed by a wireless communication system including a plurality of terminal devices, a relay device mounted on a mobile object, and at least one base station device, the wireless communication method comprising:

a terminal device transmission step of transmitting, by the terminal device, a signal including transmission data to the relay device;

a relay device reception step of receiving, by the relay device, the signal transmitted from the terminal device;

a sorting step of sorting and recording, by the relay device, the transmission data included in the signal into any one of a plurality of queues on the basis of a preamble pattern included in the signal or a reception timing of the signal; and a relay device transmission step of transmitting, by the relay device, signals indicating the transmission data recorded in the plurality of queues to the base station device at a timing at which communication with the base station device is possible, while prioritizing transmission data recorded in a predetermined queue among the plurality of queues.

20. A wireless communication method to be executed by a wireless communication device mounted on a mobile object, the wireless communication method comprising:

a receiving step of receiving a signal including transmission data transmitted from a terminal device;

a sorting step of sorting and recording the transmission data included in the signal into any one of a plurality of queues on the basis of a preamble pattern included in the signal or a reception timing of the signal; and a transmission step of transmitting signals indicating the transmission data recorded in the plurality of queues to a base station device at a timing at which communication with the base station device is possible, while prioritizing transmission data recorded in a predetermined queue among the plurality of queues.

21. A non-transitory computer-readable recording medium storing a program for causing a computer to execute processes as a wireless communication device mounted on a mobile object, the processes comprising:

receiving a signal including transmission data transmitted from a terminal device;

sorting and recording the transmission data included in the signal into any one of a plurality of queues on the basis of a preamble pattern included in the signal or a reception timing of the signal; and transmitting signals indicating the transmission data recorded in the plurality of queues to a base station device at a timing at which communication with the base station device is possible, while prioritizing transmission data recorded in a predetermined queue among the plurality of queues.

* * * * *